United States Patent
Courtney et al.

(10) Patent No.: US 11,493,139 B1
(45) Date of Patent: *Nov. 8, 2022

(54) INFLATION VALVE FOR TUBELESS TIRES

(71) Applicant: Santa Cruz Bicycles, LLC, Santa Cruz, CA (US)

(72) Inventors: Brett Robert Courtney, Menlo Park, CA (US); James Mathew Amaral, Morgan Hill, CA (US); Nick Anderson, Santa Cruz, CA (US); Jon Wood, Campbell, CA (US)

(73) Assignee: Santa Cruz Bicycles, LLC, Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,062

(22) Filed: Aug. 20, 2021

(51) Int. Cl.
    *F16K 15/20*      (2006.01)
    *F16K 27/02*      (2006.01)
    *B60C 29/00*      (2006.01)

(52) U.S. Cl.
CPC ........ *F16K 27/0209* (2013.01); *B60C 29/005* (2013.01); *F16K 15/20* (2013.01); *Y10T 137/3755* (2015.04); *Y10T 137/3786* (2015.04)

(58) Field of Classification Search
CPC ......... Y10T 137/3755; Y10T 137/3786; Y10T 137/374; F16K 15/20; B60C 29/005
See application file for complete search history.

(56) References Cited

U.S. PATENT DOCUMENTS

| | | | | |
|---|---|---|---|---|
| 499,956 A * | 6/1893 | Berry | ...................... | F16K 15/20 285/200 |
| 635,661 A * | 10/1899 | Cole | ...................... | F16K 15/20 137/232 |
| 641,345 A * | 1/1900 | Storz | ...................... | F16K 15/20 137/232 |
| 1,169,277 A * | 1/1916 | Newsom | ................ | F16K 15/20 137/232 |
| 1,174,168 A * | 3/1916 | Kraft | ...................... | F16K 15/20 251/339 |
| 1,237,512 A * | 8/1917 | Harrison | ............... | B60C 23/061 137/232 |
| 1,289,474 A * | 12/1918 | Keister | ................... | F16L 29/00 137/232 |
| 1,353,415 A * | 9/1920 | Newsom | ................ | F16K 15/20 137/232 |

(Continued)

FOREIGN PATENT DOCUMENTS

| | | |
|---|---|---|
| CN | 111942088 A | 11/2020 |
| EP | 3748208 A1 | 12/2020 |
| TW | M575491 U | 3/2019 |

*Primary Examiner* — Robert K Arundale
(74) *Attorney, Agent, or Firm* — Kolitch Romano Dascenzo Gates LLC

(57) ABSTRACT

A tire inflation valve having anti-rotation features has an external valve seat, and includes a valve body, a valve stem extending through the length of the valve body, and anti-rotation features disposed interior to the valve body. The valve stem is configured to move relative to the valve body, such that a resilient seating surface disposed at a proximal end of the valve stem is displaced relative to a valve seat formed by an exterior surface of a proximal end of the valve body. The anti-rotation features may include a complementary slot and protrusion, a keyway and complementary protruding ridge, and/or complementary channels and lateral protrusions.

9 Claims, 29 Drawing Sheets

(56) References Cited

U.S. PATENT DOCUMENTS

| | | | | |
|---|---|---|---|---|
| 1,490,628 | A * | 4/1924 | Myers | F16K 15/20 |
| | | | | 251/216 |
| 1,563,871 | A * | 12/1925 | Roller | F16K 15/20 |
| | | | | 251/291 |
| 1,666,562 | A * | 4/1928 | Gits | F16K 15/20 |
| | | | | 137/233 |
| 1,671,123 | A * | 5/1928 | Payne | B60C 23/0496 |
| | | | | 137/227 |
| 2,106,671 | A * | 1/1938 | Watson | F16K 15/20 |
| | | | | 137/232 |
| 11,345,196 | B2 * | 5/2022 | Su | B60C 29/002 |
| 2013/0284964 | A1 * | 10/2013 | Wen | B60C 29/04 |
| | | | | 251/356 |
| 2019/0390785 | A1 * | 12/2019 | Moore | F16K 15/20 |
| 2020/0331311 | A1 * | 10/2020 | Courtney | B29C 73/166 |
| 2021/0254733 | A1 * | 8/2021 | Wu | F16K 11/07 |

* cited by examiner

INFLATION VALVE FOR TUBELESS TIRES

FIELD

This disclosure relates to systems and methods for tire valves. More specifically, the disclosed embodiments relate to inflation valves used with tubeless tires.

INTRODUCTION

Tubeless bicycle tires, which are pneumatic tires that do not require an inner tube, are increasingly popular in road and mountain bikes, as they provide increased traction, the ability to instantly seal out tire punctures, decreased weight, and increased speed when compared with conventional bicycle tires. However, tubeless tires are more difficult to install than conventional bicycle tires, and require more maintenance. Tubeless bicycle tires must be initially seated in a bicycle rim, a process which requires constant air pressure. Additionally, sealant must be present in the air mixture filling the tires to maintain a constant seal between the tire and the rim.

Many tubeless tires use either Presta valves or Schrader valves to facilitate inflating the tire. However, these valves typically provide insufficient air flow for initial seating of the tire to the rim, do not allow for easy addition of sealant, and are often clogged by sealant due to their small diameter. Some existing tubeless tire valves allow for the addition of sealant by providing a valve core removal tool. However, these valves require complete deflation of the tire for sealant addition and are built within a Presta or Schrader valve body, resulting in the same air flow and clogging problems as typical Presta or Schrader valves.

SUMMARY

The present disclosure provides systems, apparatuses, and methods relating to tubeless tire valves having stems with anti-rotation features.

In some embodiments, an inflation valve for a tubeless tire may include: a valve body having a proximal end, an open distal end, and defining an internal cavity; and a valve stem having a long axis and extending through the internal cavity, such that a threaded end of the valve stem protrudes beyond the open distal end of the valve body; wherein the proximal end of the valve body comprises a valve seat having an outer diameter larger than an inner diameter of the valve body, and a corresponding proximal end of the valve stem includes a resilient seating surface and a radial protrusion received by a slot in a side wall of the valve body; wherein the valve is configured to be transitionable between: (a) a closed position, in which the resilient seating surface mates with the valve seat and seals the proximal end of the valve body, and the threaded end of the valve stem extends beyond the distal end of the valve body by a first distance, and (b) an open position, in which the resilient seating surface is spaced from the valve seat, and the threaded end of the valve stem extends beyond the distal end of the valve body by a second distance less than the first distance; and wherein the slot and the radial flange collectively restrict rotation of the valve stem about the long axis.

In some embodiments, an inflation valve for a tubeless tire may include: a valve body having a proximal end and an open distal end, and defining an internal cavity; and a valve stem extending continuously through the internal cavity, such that a threaded end of the valve stem protrudes beyond the open distal end of the valve body; wherein the proximal end of the valve body comprises a valve seat having an outer diameter larger than an inner diameter of the valve body and a recessed keyway, and a corresponding proximal end of the valve stem includes a valve plug including a resilient seating surface and an elongate protruding ridge configured to be received by the keyway; wherein the valve is configured to be transitionable between: (a) a closed position, in which the resilient seating surface mates with the valve seat and seals the proximal end of the valve body, and the threaded end of the valve stem extends beyond the distal end of the valve body by a first distance, and (b) an open position, in which the resilient seating surface is spaced from the valve seat, and the threaded end of the valve stem extends beyond the distal end of the valve body by a second distance less than the first distance; and wherein the keyway and the elongate protruding ridge collectively restrict rotation of the valve stem when the valve is in use.

In some embodiments, an inflation valve for a tubeless tire may include: a valve body having a proximal end and an open distal end, and defining an internal cavity, and including at least one interior channel extending the length of the valve body; and a valve stem extending continuously through the internal cavity, such that a threaded end of the valve stem protrudes beyond the open distal end of the valve body, and including at least one lateral protrusion coupled to an elongate valve shaft of the valve stem; wherein the proximal end of the valve body comprises a valve seat having an outer diameter larger than an inner diameter of the valve body and a corresponding proximal end of the valve stem includes a resilient seating surface; wherein the valve is configured to be transitionable between: (a) a closed position, in which the resilient seating surface mates with the valve seat and seals the proximal end of the valve body, and the threaded end of the valve stem extends beyond the distal end of the valve body by a first distance, and (b) an open position, in which the resilient seating surface is spaced from the valve seat, and the threaded end of the valve stem extends beyond the distal end of the valve body by a second distance less than the first distance; wherein the at least one lateral protrusion is configured to be slidably received by the at least one channel; and wherein the at least one channel and the at least one protrusion collectively restrict rotation of the valve stem when the valve is in use.

Features, functions, and advantages may be achieved independently in various embodiments of the present disclosure, or may be combined in yet other embodiments, further details of which can be seen with reference to the following description and drawings.

DETAILED DESCRIPTION

Figure 1:
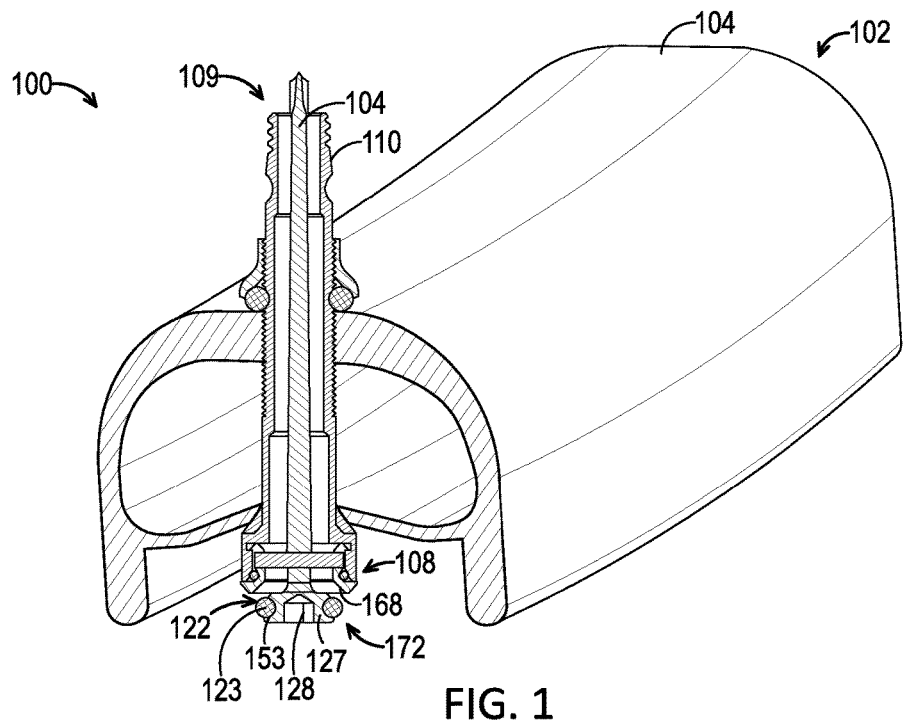
FIG. 1 is an isometric view of a first illustrative tire valve, seated within a tubeless bicycle tire, in accordance with aspects of the present disclosure.

Various aspects and examples of tire inflation valves having stems with anti-rotation features, as well as related methods are described below and illustrated in the associated drawings. Unless otherwise specified, a tire valve in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a tire inflation valve having a stem with anti-rotation features in accordance with the present teachings may include an external valve seat and a valve body, a valve stem extending through the length of the valve body, and a retaining mechanism for the valve stem disposed interior to the valve body. The valve body defines an interior cavity through which the valve stem moves axially during valve operation. The valve stem includes a threaded end disposed at a distal end, and a resilient seating surface (e.g., an O-ring) disposed at a proximal end. The valve stem is configured to move relative to the valve body, such that the resilient seating surface is displaced relative to a valve seat formed by an exterior surface of the proximal end of the valve body. Accordingly, in some examples, an outer diameter (OD) of the valve seat is larger than the inner diameter (ID) of the valve body, facilitating increased air flow through the valve, especially as compared with valves having internal valve seats. In some examples, an ID of the valve seat is the same size as the ID of the valve body.

In some examples, the threaded end of the valve stem is configured to mate with interior threads of a corresponding valve cap. Accordingly, if the valve stem is free to rotate, attempting to screw or unscrew the valve cap may be thwarted because the valve stem can spin freely within the valve cavity. Anti-rotation features included within the valve stem and/or valve body are configured to prevent the valve stem from spinning, facilitating (among other things) removal of the valve cap from the valve stem.

The valve includes anti-rotation features, e.g., disposed within the interior cavity of the valve body. Generally, the anti-rotation features comprise a recessed portion, such as a groove, recess, slot, channel, and/or the like disposed within walls of the valve body paired with a protruding portion, such as a tang, flange, poppet and/or the like coupled to the valve stem. The recessed feature generally receives the protruding feature, collectively preventing or reducing rotation of the valve stem when the valve is in use. In some examples, the anti-rotation features may additionally restrict movement of the valve stem to a selected range of motion. In some examples, the anti-rotation features may reversibly couple the valve stem to the valve body.

In some examples, the anti-rotation features comprise a slot disposed at a proximal end of the walls of the valve body through which a protrusion may extend. The protrusion may extend radially from a proximal end of the valve stem. The protrusion may be received by the slot, such that the protrusion contacts edges of the slot when the valve stem is laterally translated or rotated within the valve cavity to boundaries of a range of motion defined by the slot. Accordingly, the slot and protrusion may collectively restrict rotation of the valve stem, as well as limit a lateral range of motion of the valve stem and secure the valve stem to the valve body. In some examples, the valve stem is coupled to the valve body by a threaded insert disposed at the proximal end of the valve body. For example, the threaded insert may include the slot, and removing the threaded insert from the valve body may uncouple the valve stem from the valve body. In some examples, the threaded insert also includes a portion external to the valve body on which the valve seat is formed.

In some examples, the anti-rotation features comprise a pair of slots disposed at a proximal end of the walls of the valve body through which a pair of protrusions may extend. The slots may be collectively defined by a pair of notches disposed within a proximal end of the walls of the valve body and a removable cap which is snapped onto the proximal end of the valve body. The removable cap includes an aperture through which air may flow when the valve is in the open position. The protrusions may each be received by a slot, such that the protrusion contacts edges of the slot when the valve stem is laterally translated or rotated within the valve cavity to boundaries of a range of motion defined by the slot. In some examples, removing the removable cap from the valve body facilitates removal of the valve stem.

In some examples, the anti-rotation features comprise a keyway disposed at a proximal end of the valve body configured to receive a keyed valve plug. The keyed valve plug includes the resilient seating surface disposed at a proximal end of the valve stem and a protruding ridge disposed between the resilient seating surface and an elongate valve shaft extending from the resilient seating surface to the distal end of the valve stem. The keyway comprises a complementary trench, recess, and/or channel configured to receive the ridge when the resilient seating surface is directly contacting the valve seat. Generally, the protruding ridge and the keyway have no more than two axes of symmetry, such that the protruding ridge may only be received within the keyway at two different orientations. Accordingly, the protruding ridge and the keyway may collectively restrict orientation of the valve stem to two positions when the resilient seating surface is directly contacting the valve seat.

In some examples, the anti-rotation features comprise a keyed radial protrusion extending from opposite sides of the valve stem, and an internal keyway disposed within the valve body configured to receive the keyed radial protrusion. The keyed radial protrusion and the keyway may have no more than two axes of symmetry, such that the protruding ridge and the keyway may collectively restrict orientation of the valve stem to two positions when the valve is in the closed position. The anti-rotation features may further comprise a circumferential channel disposed within the valve body proximate the valve seat. The circumferential channel may be configured to receive a circlip, c-clip, and/or snap ring which may provide an upper or proximal bound for axial motion of the valve stem. Similarly, the keyway may provide a lower or distal bound for axial motion of the valve stem.

In some examples, the anti-rotation features comprise one or more radial protrusions extending laterally along the valve stem (e.g., oriented generally in parallel with the long axis), and respective slots and/or channels disposed within the walls of the valve body. The protrusions slide within their respective slots as the valve stem is laterally translated. Accordingly, the slots and protrusions collectively restrict rotation of the valve stem. In some examples, the anti-rotation features comprise a pair of protrusions and a pair of slots. In some examples, the anti-rotation features comprise three protrusions and three slots. The protrusions may be disposed along any portion of the elongate valve shaft of the valve stem. In some examples, the protrusions are disposed closer to the threaded end of the valve stem than to the proximal end of the valve stem.

The valve is transitionable between a closed position, in which the resilient seating surface mates with the valve seat, sealing the proximal end of the body, and an open position, in which the resilient seating surface is spaced apart from the valve seat, allowing air to flow through the valve. The seating surface at the end of the valve stem is configured to move toward and away from the proximal end of the valve body, and during use is normally biased against the valve seat by air pressure in the tire. In some examples, anti-rotation features as described above may limit movement of the proximal end of the valve stem away from the valve seat. In some examples, a slot included in an anti-rotation feature may constrain a lateral range of motion of the valve stem to within a first range of positions corresponding to a height or vertical dimension of the slot.

In some examples, the valve stem is longer than the valve body, such that the threaded end protrudes from the distal end of the valve body. The threaded end may be pressed inward (toward the proximal end) by a user, unseating and opening the valve. As mentioned above, this action is opposed by a spring force exerted by air pressure within the tubeless tire. The valve is maintained in the closed position unless a greater force is exerted on the valve stem, thereby moving the resilient seating surface away from the valve seat.

In some examples, the valve includes a valve cap configured to cover the threaded distal end of the valve stem. The valve cap includes internal threads configured to mate with the threaded end of the valve stem. In some examples, the valve cap is configured to "lock" the valve stem into a closed position. For example, the valve cap may prevent axial displacement of the valve stem when the valve cap is fully threaded onto the threaded end. In some examples, the valve stem is axially displaceable when the valve cap is partially threaded onto the threaded end. For example, a user may press the valve cap toward the proximal end of the valve in this condition, releasing air from the valve without fully removing the cap. The valve cap may include an internal groove or channel configured to provide a path for the release of air from the valve while the cap is threaded onto the valve stem.

In some examples, the threaded end of the valve stem includes trimmed or partial threads, improving air flow. The threads may be trimmed so that the threaded end has two opposing flat surfaces, with threaded portions extending between the flat surfaces. In some examples, the threaded end of the valve stem includes grooves, slots, or channels disposed along the flat surfaces, which may further increase airflow.

In some examples, the exterior surface of the valve body includes a circumferential groove near the distal end, facilitating connection with a quick connect pump head. In some examples, the exterior surface of the valve body includes threads, facilitating connection with a pump head for a standard threaded bicycle pump. In some examples, the exterior surface of the valve body includes threads disposed near the distal end of the valve body and includes a circumferential groove disposed between the threads and the proximal end of the valve body, so that the valve is compatible with both a quick connect pump head and a standard pump head. In some examples, the threads are flattened to improve sliding of the cap along the valve body or of a quick connect attachment along the valve body.

A method of releasing air from a tire valve may include: unscrewing a valve cap, optionally back-threading the valve cap, pressing the valve cap toward a proximal end of the valve, and releasing air from the valve.

A method of disassembling a bicycle valve (e.g., for cleaning purposes) may include: placing a key (e.g., a hex or Allen key) in a polygonal socket disposed on the proximal end of the valve, turning the Allen key counterclockwise, and removing internal valve components. As described above, for example, turning the insert at the proximal end of the valve body would eventually unthread and remove the insert, along with the stem coupled thereto.

Examples, Components, and Alternatives

The following sections describe selected aspects of illustrative tire valves having anti-rotation features as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Valve

As shown in FIGS. 1-6, this section describes an illustrative bicycle valve 100. Bicycle valve 100 is an example of the valves for tubeless bicycle tires, described above. Valve 100 is configured to be installed in a bicycle rim 102, as illustrated in FIG. 1. Valve 100 regulates a flow of air into and out of a tubeless tire, which may be installed onto rim 102.

Figure 2:
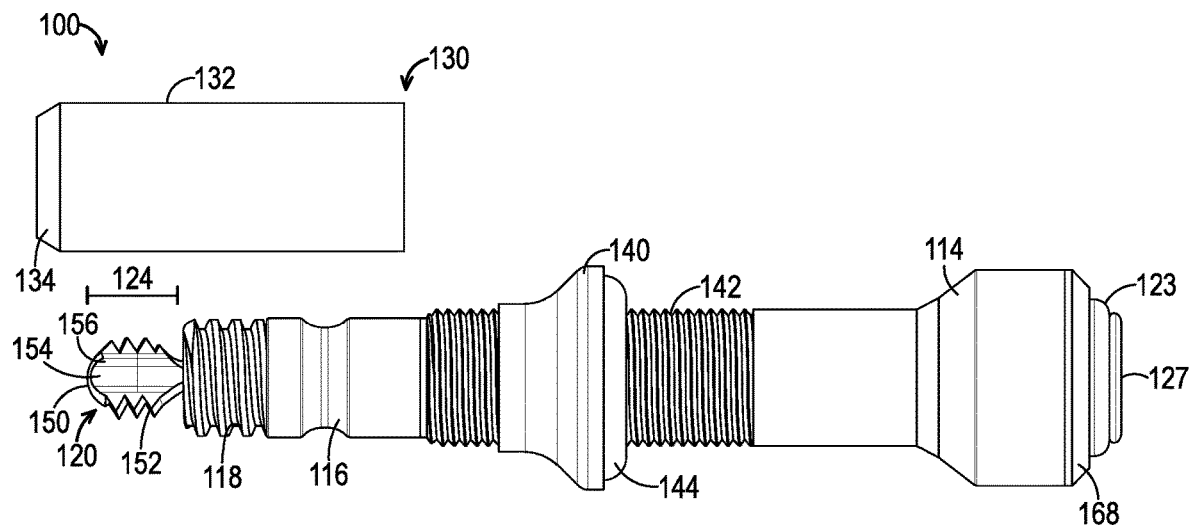
FIG. 2 is a side view of the first illustrative tire valve of FIG. 1, depicted in a closed configuration.
Figure 3:
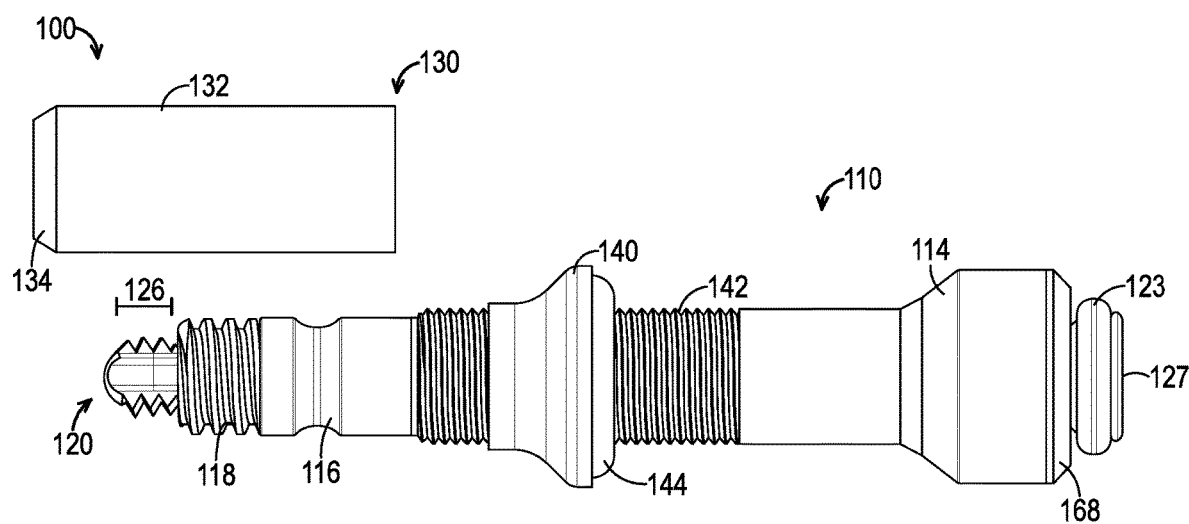
FIG. 3 is a side view of the first illustrative tire valve of FIG. 1, depicted in an open configuration.

Valve 100 is transitionable between a closed position (see FIG. 2) and an open position (see FIG. 3). Valve 100 includes a valve body 110 defining an internal cavity 112 and a valve stem 120 (AKA valve rod), which extends continuously through and is movable within the valve cavity. As shown in FIG. 2, when valve 100 is in the closed position, a resilient seating surface 122 disposed at a proximal end 172 of the valve stem mates with a valve seat 168 disposed at a proximal end 108 of the valve body, sealing the proximal end of the valve. When the valve is in the closed position, valve stem 120 extends beyond a distal end of the valve body by a first distance 124. As depicted in FIG. 3, when valve 100 is in the open position, seating surface 122 is spaced apart from valve seat 168 (in a direction generally toward the tire), enabling a flow of air through the valve.

As the OD of valve seat 168 is larger than the ID of valve body 110, air flow through the valve body is not restricted by the valve seat. A flow of air through the valve and around the valve seat is generally annular, with an outer diameter of the annulus corresponding to an outer diameter of the valve seat. In some examples, a flow of air out of the valve is laminar. When the valve is in the open position, valve stem 120 extends beyond a distal end 109 of the valve body by a second distance 126. First distance 124 is greater than second distance 126, as the valve stem moves toward proximal end 108 of the valve when the valve is opening.

Valve 100 includes a removable cap 130, which covers the distal end of the valve stem. Air may be released from the valve while the cap is coupled to the valve, and the cap is removable to permit inflation through the valve. The valve also includes a mounting nut 140 for securing the valve to the rim, which is threaded onto mounting threads 142 disposed on an exterior surface of the valve body. A distal end of nut 140 may be designed to be flush with an outer diameter of cap 130. Nut 140 includes a sealing ring 144 (e.g., an O-ring) disposed within a chamfer 146 of the nut. Sealing ring 144 may comprise any suitable resilient material, such as rubber, resilient polymers, and/or the like. Sealing ring 144 may have any cross-sectional profile suitable for a gasket, such as circular, elliptical, square, rectangular, u-shaped, v-shaped, x-shaped, and/or the like. Sealing ring 144 is configured to abut an exterior surface 104 of rim 102.

To complete the clamping mechanism, valve body 110 includes a tapered flange 114 disposed adjacent the proximal end, which is configured to contact an inner wall or surface 106 of rim 102. Mounting nut 140 may be tightened or loosened as needed to secure the valve to rim 102. In some examples, the mounting nut is included as a component of a bicycle rim. In some examples, mounting nut 140 forms one component of a two-component valve body. Mounting nut 140 may comprise any suitably durable material, such as aluminum, copper, brass, steel, titanium, plastic, composite, and/or the like.

In some examples, valve 100 includes a circumferential groove 116 (AKA a quick connect groove) disposed on an exterior surface of valve body 110. Quick connect groove 116 may be configured to mate with a quick connect fitting, such as one in a quick-connect bicycle pump head. In some examples, valve 100 includes threads 118 disposed on an exterior surface of valve body 100. Threads 118 are configured to mate with threads of a standard bicycle pump head. In some examples, valve 100 includes both circumferential groove 116 and threads 118, such that valve 100 is selectively operable with either a quick connect pump or a standard pump, as desired. In some examples, threads 118 are flattened, turned down, or otherwise smoothed to facilitate sliding of cap 130 and any quick connect fittings along the exterior surface of body 110. In some examples, valve 100 includes either male or female components of a push and twist connection system, or any other suitable connection system for connecting a bicycle pump to a valve.

Valve body 110 has an interior profile configured to facilitate optimal air flow while retaining structural integrity. Walls of valve body 110 are thicker in quick connect regions and regions with external threads, and thinner or flared in other regions to allow for increased air flow. In some examples, walls of valve body 100 are flared to allow for interior threads (e.g., interior threads to hold threaded insert 164). In some examples, valve body 110 is substantially cylindrical. In some examples, valve body 110 includes external flats, which may provide a place for a user to grip (e.g., using a wrench) when tightening threaded components.

The valve may have any suitable diameter configured to allow adequate air flow without compromising structural integrity of an associated rim. In some examples, the valve has a diameter similar to that of a Presta valve (approximately 7 mm), allowing the valve to be used with rims designed to receive Presta valves. In some examples, the valve has a diameter similar to that of a Schrader valve (approximately 8.5 mm-9 mm), allowing the valve to be used with rims deigned to receive Schrader valves. The valve may comprise any suitably durable material, such as brass, copper, steel, titanium, plastic, composite, and/or the like.

Figure 4:
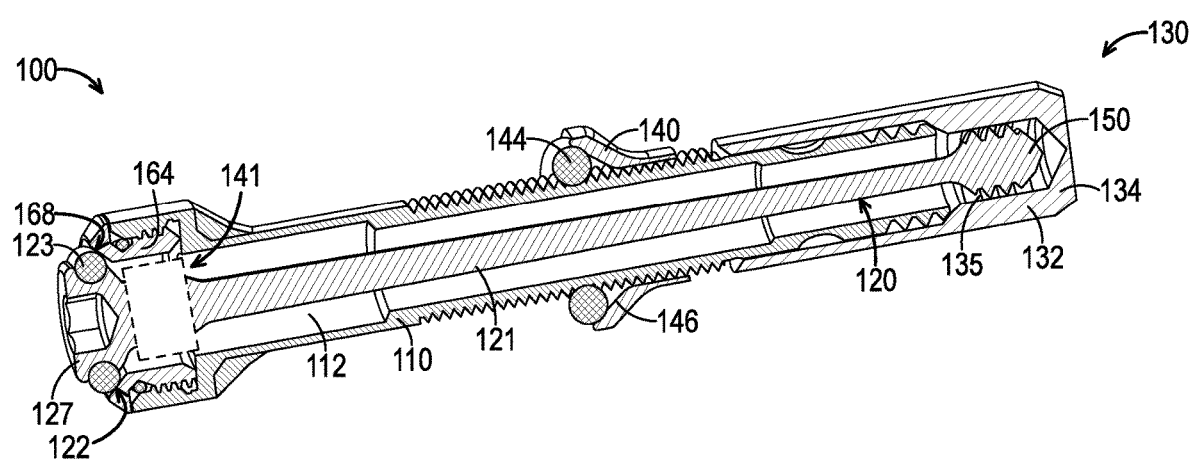
FIG. 4 is a sectional view of the first illustrative tire valve of FIG. 1, shown in a closed configuration.
Figure 5:
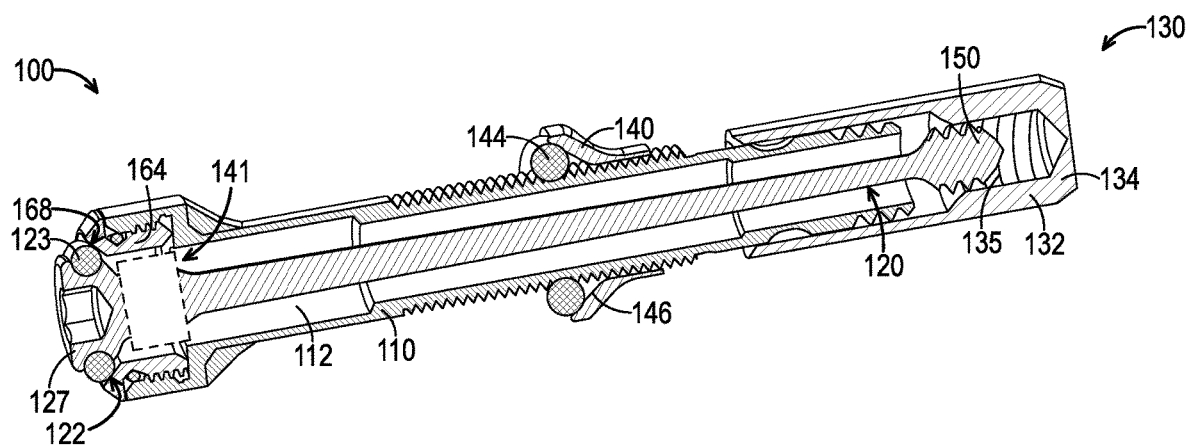
FIG. 5 is a sectional view of the first illustrative tire valve of FIG. 1, shown with the cap partially unscrewed and the valve fully closed.
Figure 6:
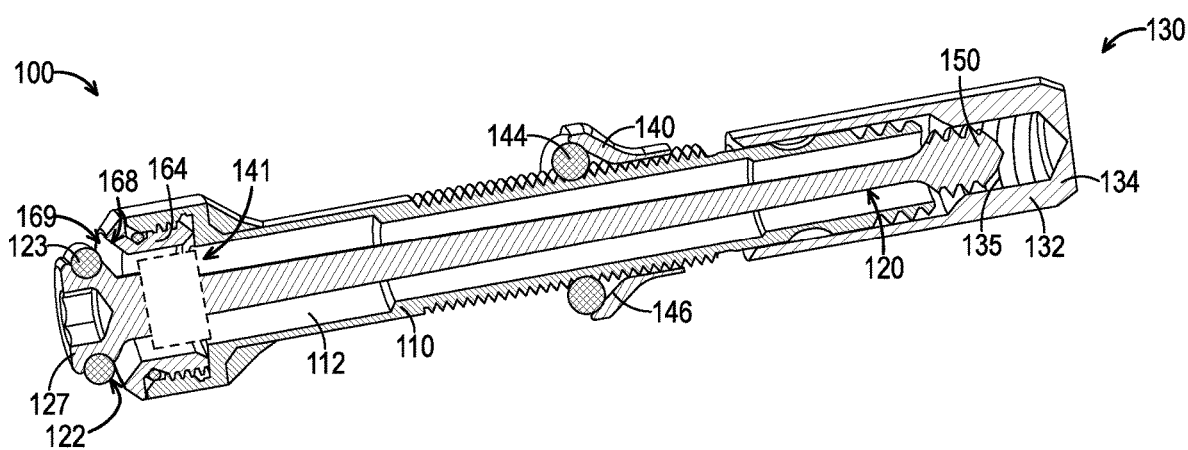
FIG. 6 is a sectional view of the first illustrative tire valve of FIG. 1, shown in an open configuration.

Valve 100 is configured such that normal operation of the wheel (e.g., riding the host bicycle) and selected manual deflation of the tire via the valve are both facilitated while cap 130 remains installed and covering the distal end of the valve stem (see FIGS. 4-6). Cap 130 includes internal threads 135 which are configured to mate with a threaded end 150 of valve stem 120.

As depicted in FIG. 4, cap 130 may be placed into a first position configured to "lock" the valve closed (i.e., with the valve fully seated). In this position, cap 130 is screwed fully onto threads 152 of threaded end 150, such that the valve stem may not be pressed or otherwise moved toward the proximal end of the valve. In this position, an interior surface of the cap abuts an end surface of the valve body, preventing both the valve stem and the cap from moving toward the opened position. In this position, resilient seating surface 122 is secured against valve seat 168, and no air flows through the valve.

As depicted in FIG. 5, cap 130 may be placed into a second position by partially unscrewing cap 130 from the threaded end of the valve stem, such that the cap remains attached to threaded end 150, but the cap no longer abuts the distal end of the valve body. In this position, resilient seating surface 122 remains seated on valve seat 168, but valve stem 120 is free to move along its long axis. If the valve is installed in a rim having a tubeless tire, the valve remains seated due to the force exerted by air pressure within the tire.

FIG. 6 depicts the valve in an open position. In this position, cap 130 has been pressed toward the proximal end of the valve, moving valve stem 120 by a corresponding distance due to the mating connection between the cap and stem. Resilient seating surface 122 is unseated and moved away from valve seat 168, allowing air to exit the tire through the resulting annular opening 169. Depending on how far the cap has been unthreaded, travel of the valve stem is limited by an anti-rotation feature 141 (as described below), and/or by the cap coming into contact with the distal end of the valve.

As cap 130 is coupled to valve stem 120 by threads 135 and 132, the valve body and valve stem collectively include one or more anti-rotation features 141, which may collectively prevent or reduce rotation of the valve stem when the valve is in use. In the absence of anti-rotation features, rotating the cap may rotate the valve stem, resulting in a user being unable to unscrew the threaded valve cap from the threaded end of the valve stem. In some examples, the anti-rotation features may restrict movement of the valve stem to a selected range of motion. In some examples, the anti-rotation features may reversibly couple the valve stem to the valve body.

Anti-rotation features 141 generally comprise a female or recessed portion, such as a groove, recess, slot, channel, and/or the like paired with a male or protruding portion, such as a tang, flange, poppet and/or the like. The recessed feature receives the protruding feature, thereby collectively preventing or reducing rotation of the valve stem when the valve is in use. In some examples the recessed portion is disposed in or on the wall(s) of the valve body, and the protruding portion is disposed on or coupled to the valve stem. In some examples, the recessed portion is disposed in or on the valve stem, and the protruding portion is disposed on or coupled to the wall(s) of the valve body. In some examples, anti-rotation features 141 may additionally restrict movement of the valve stem to a selected range of motion. In some examples, anti-rotation features 141 may reversibly couple the valve stem to the valve body.

Figure 7:
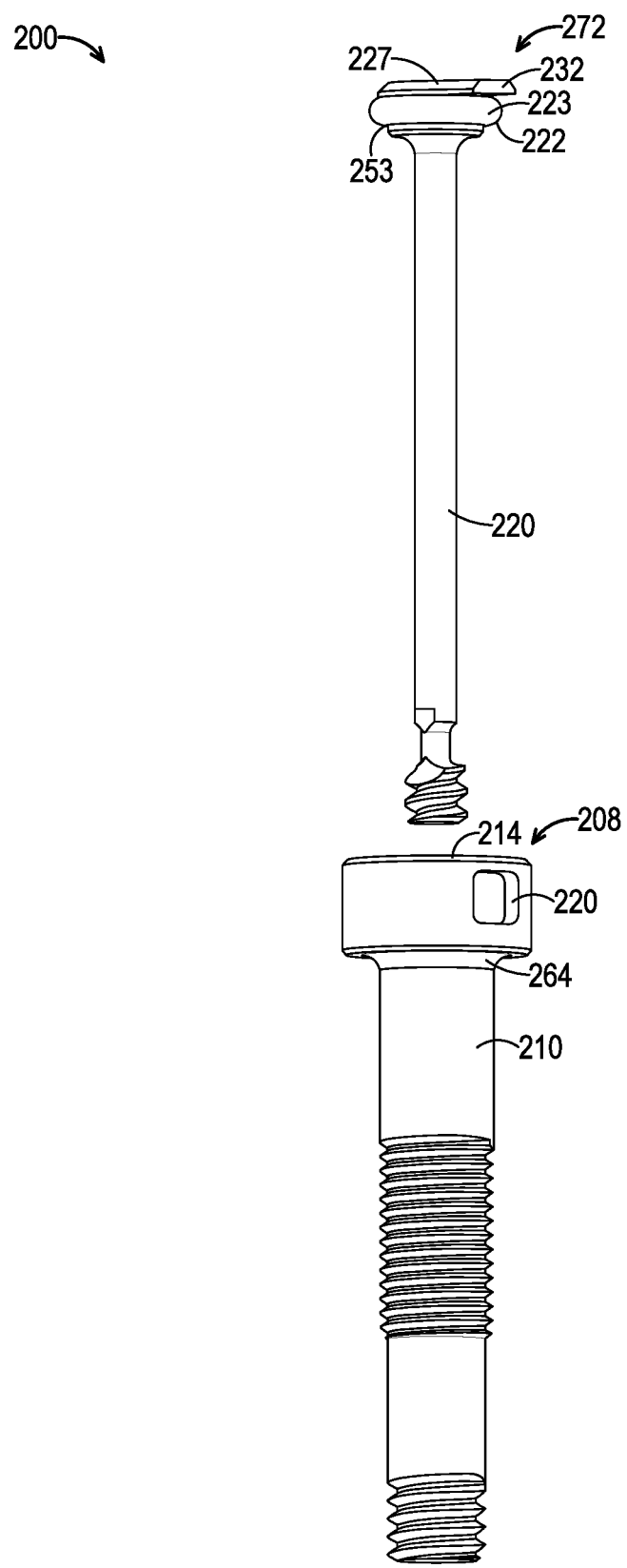
FIG. 7 is an exploded view of a second illustrative tire valve.
Figure 8:
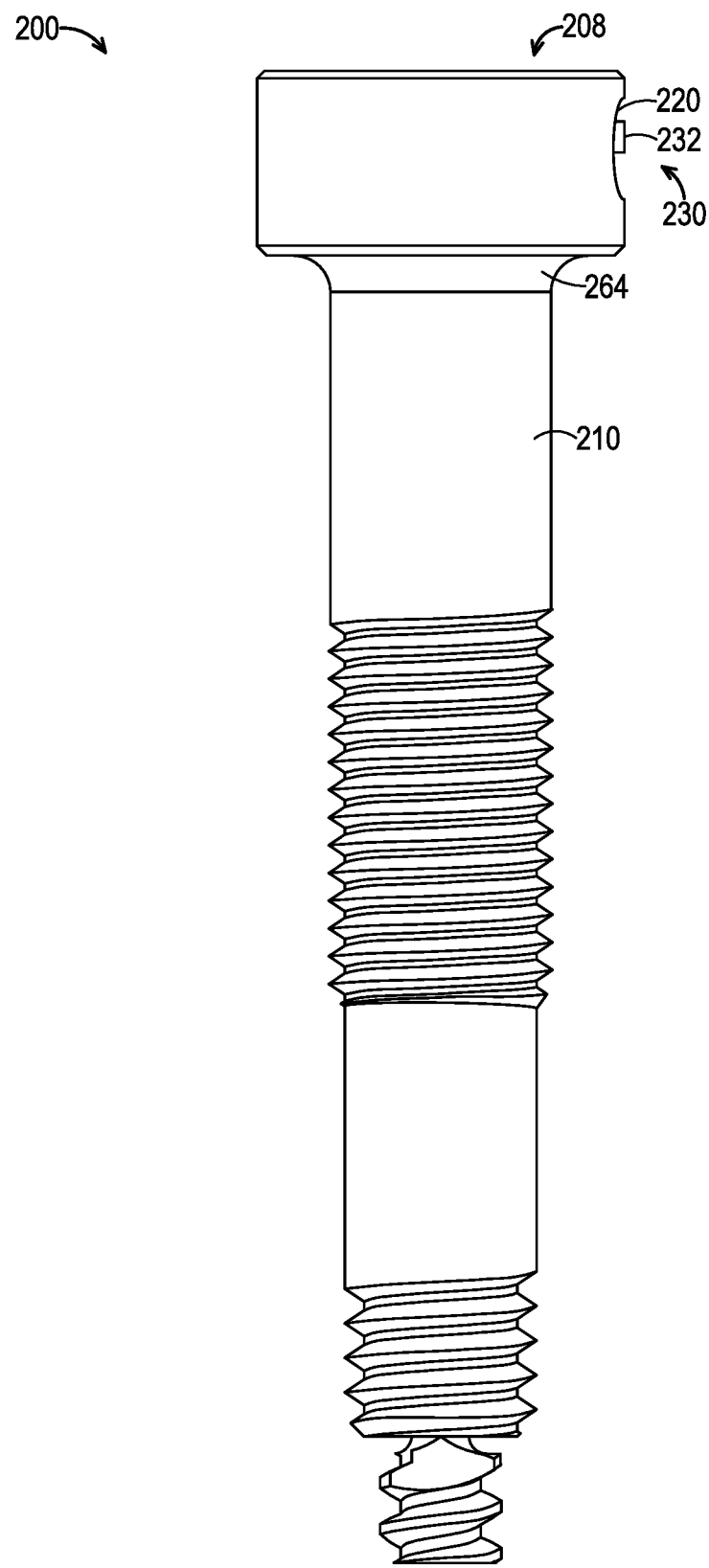
FIG. 8 is a side view of the second illustrative tire valve of FIG. 7.
Figure 9:
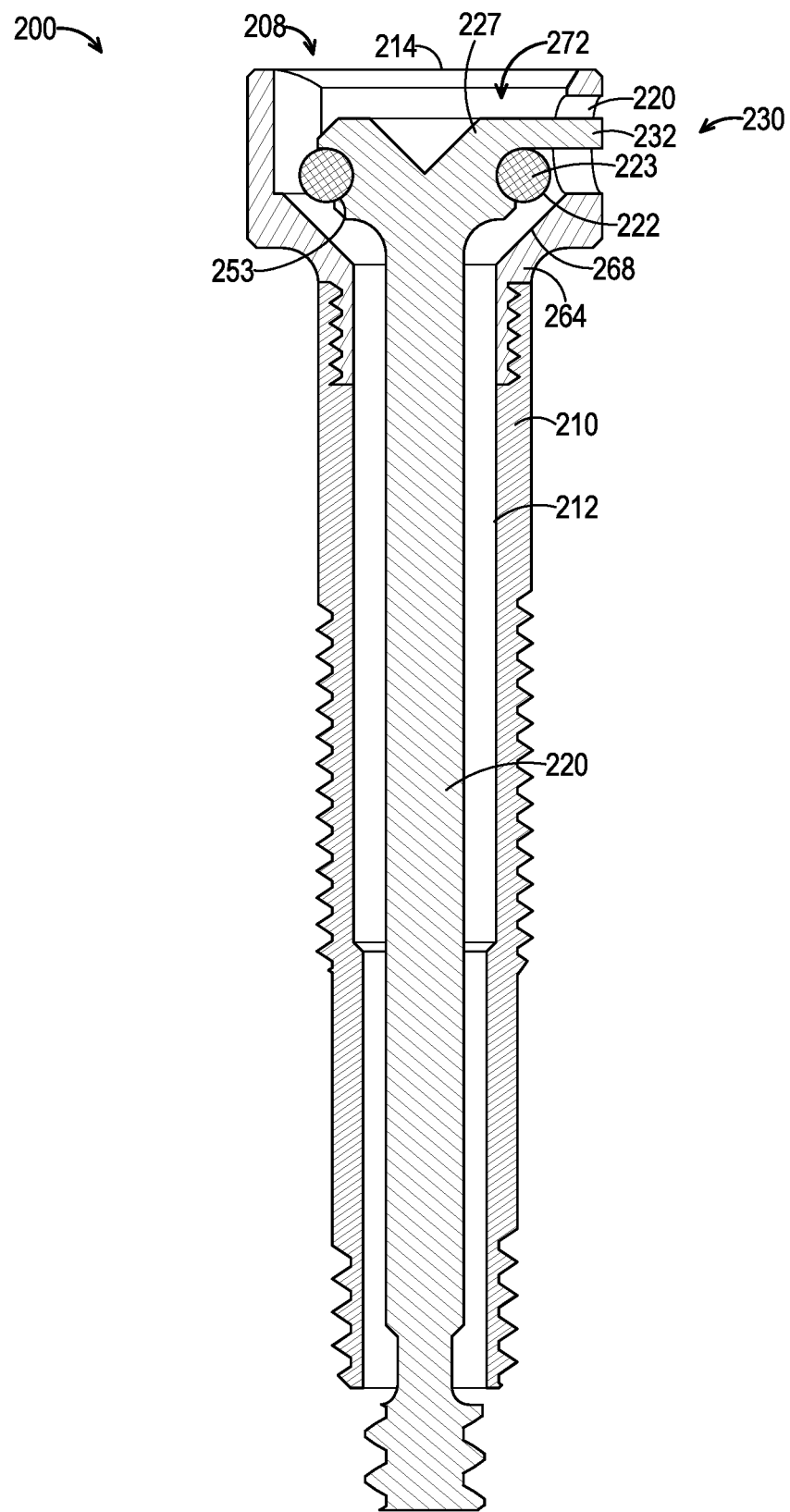
FIG. 9 is a sectional view of the second illustrative tire valve of FIG. 7.
Figure 10:
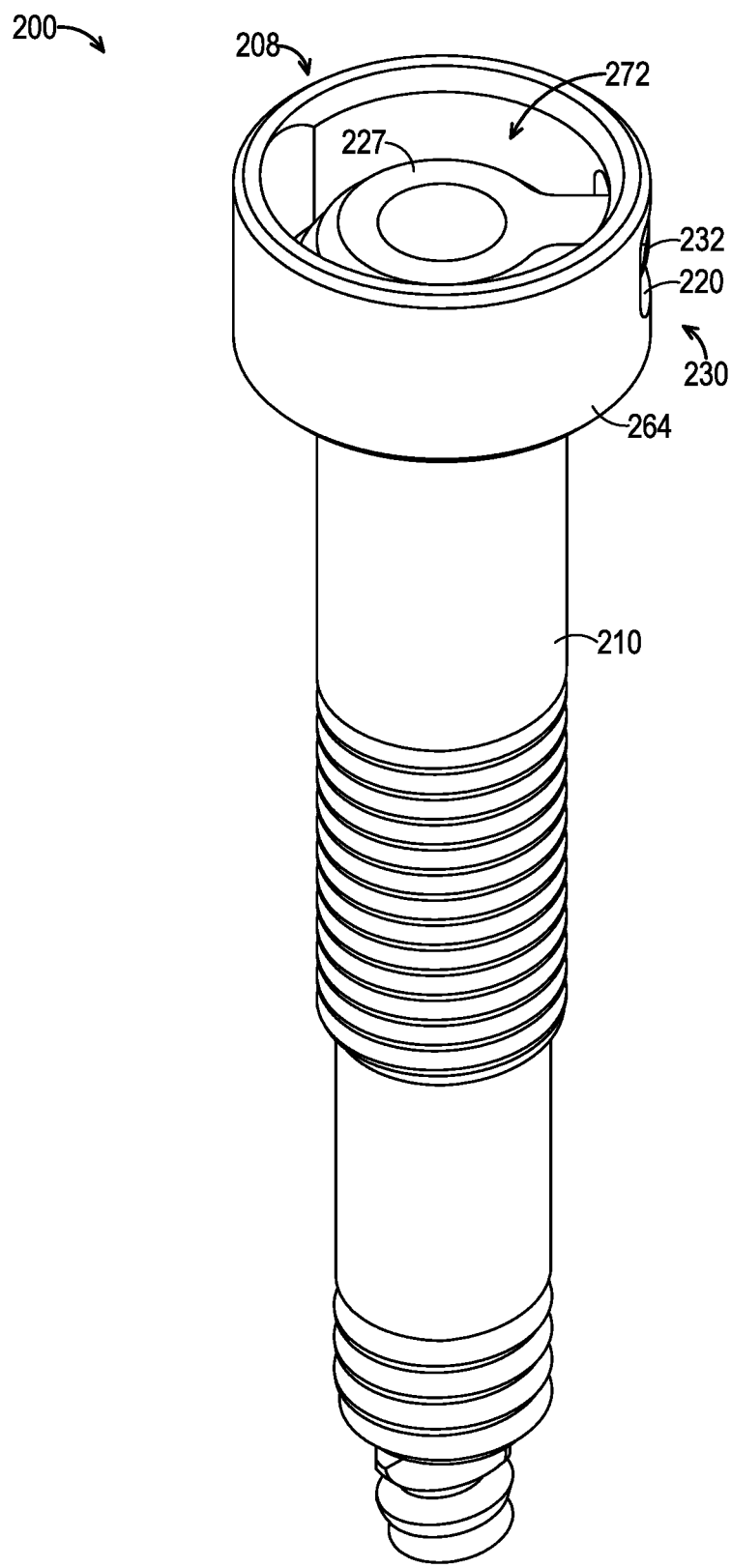
FIG. 10 is an isometric view of the second illustrative tire valve of FIG. 7.
Figure 11:
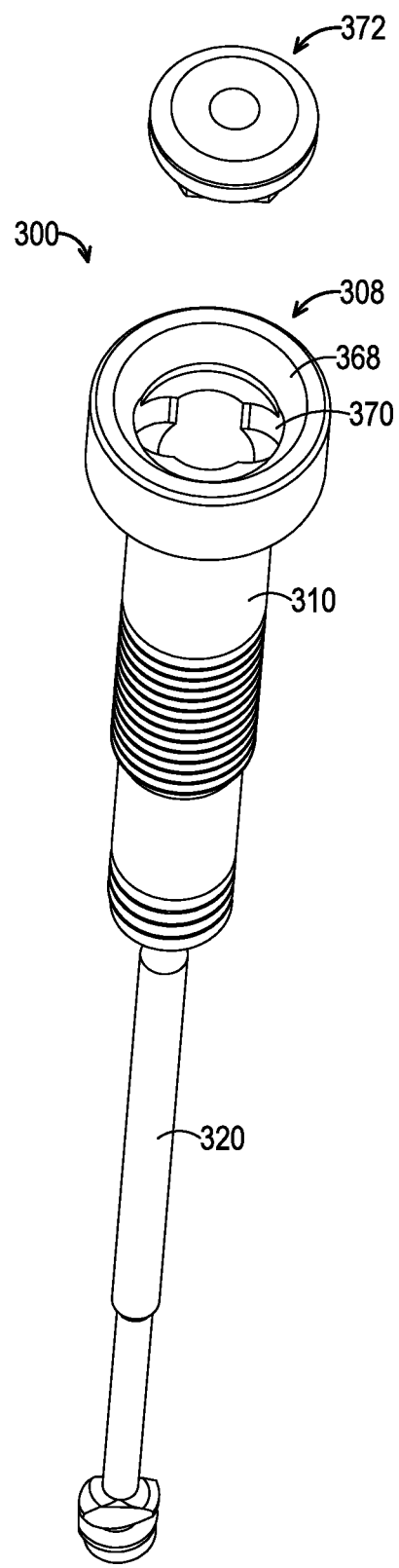
FIG. 11 is an exploded view of a third illustrative tire valve.
Figure 12:
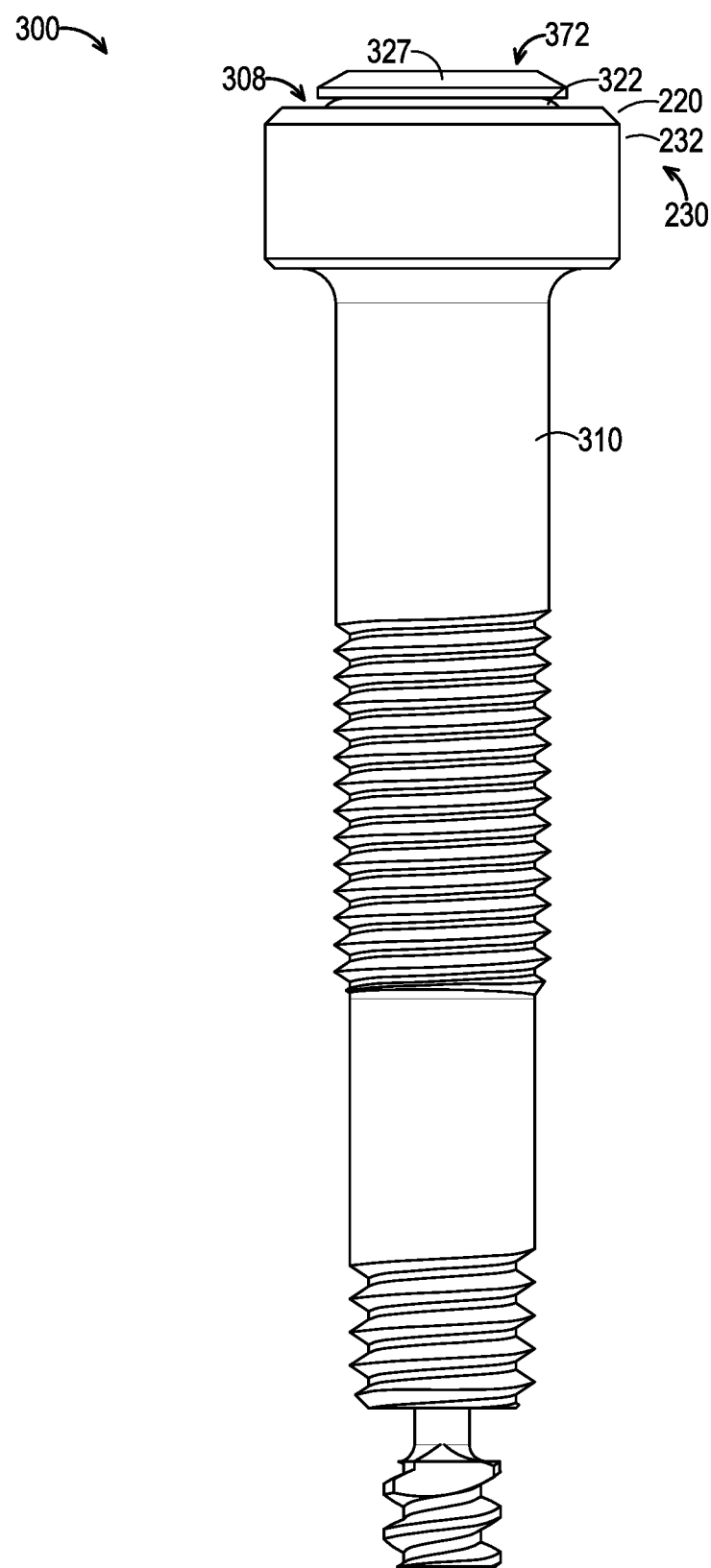
FIG. 12 is a side view of the third illustrative tire valve of FIG. 11.
Figure 13:
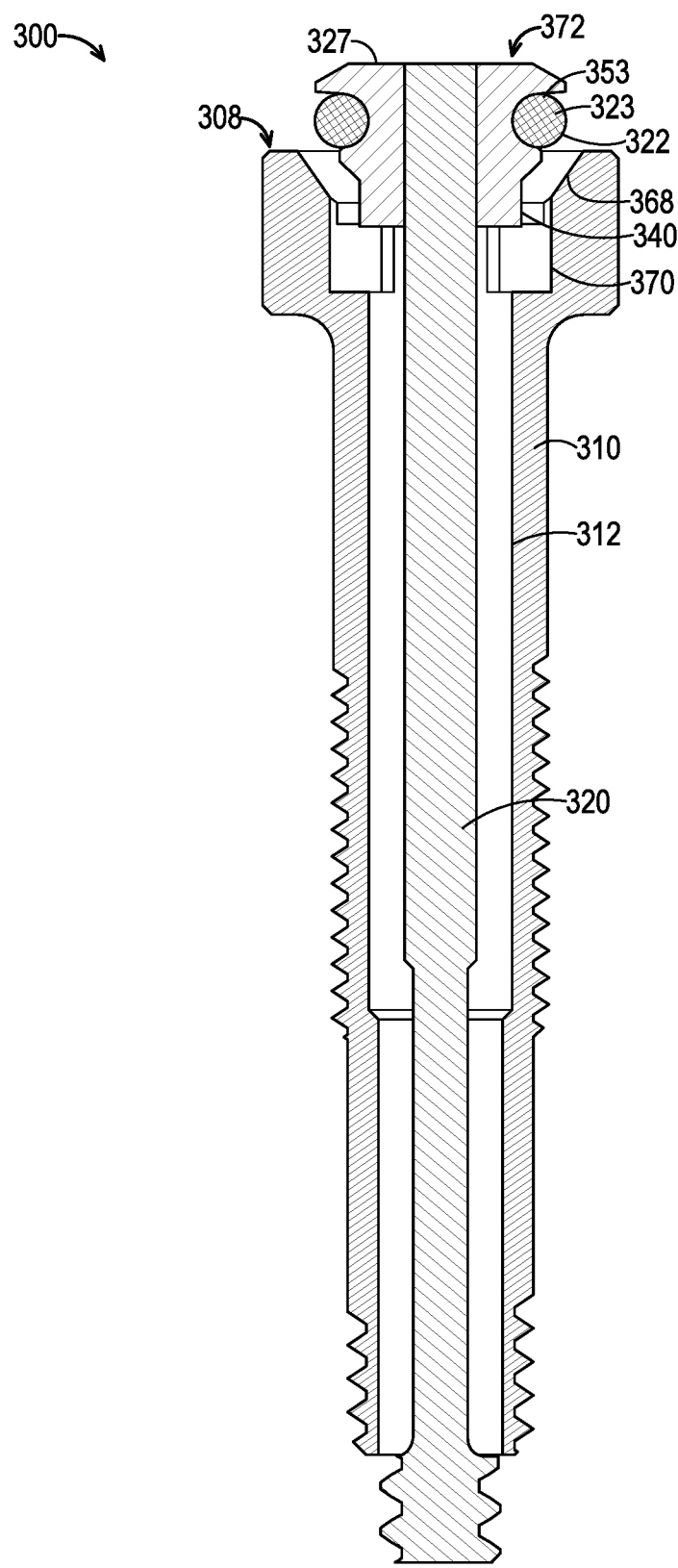
FIG. 13 is a sectional view of the third illustrative valve of FIG. 11.
Figure 14:
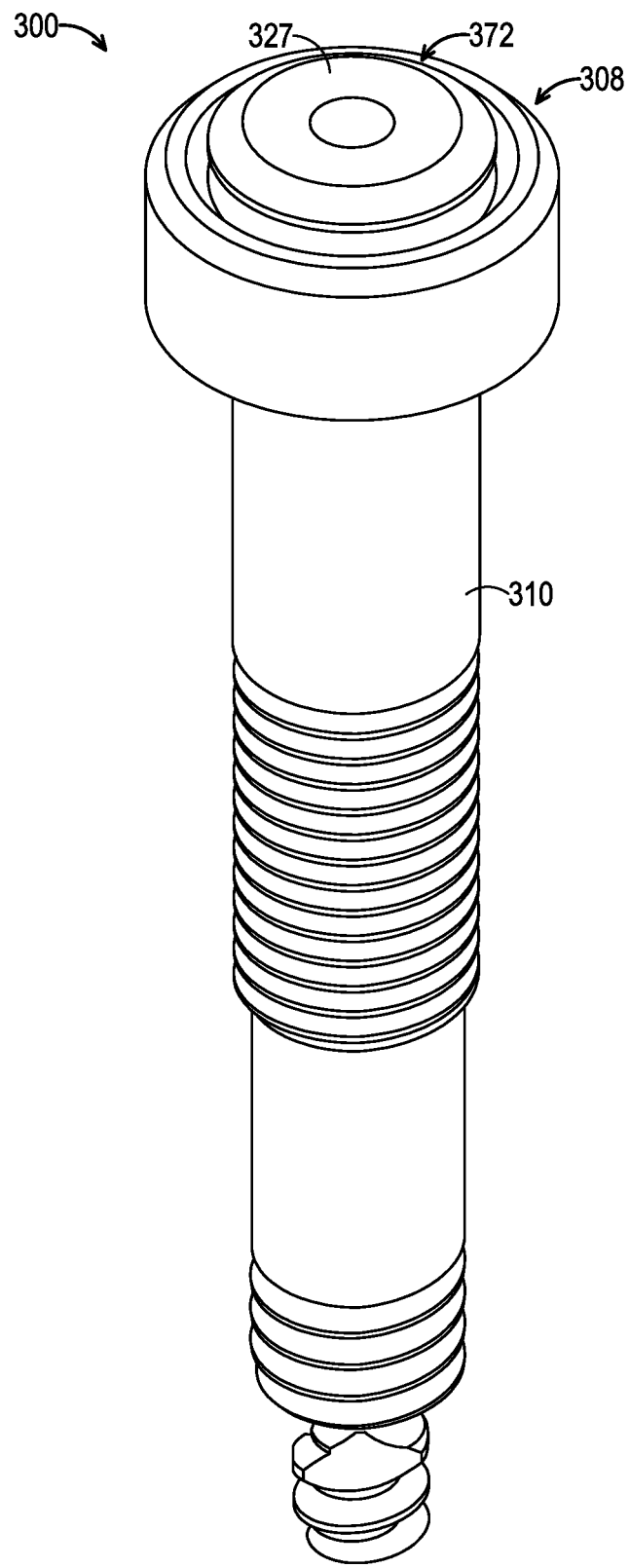
FIG. 14 is an isometric view of the third illustrative valve of FIG. 11.
Figure 15:
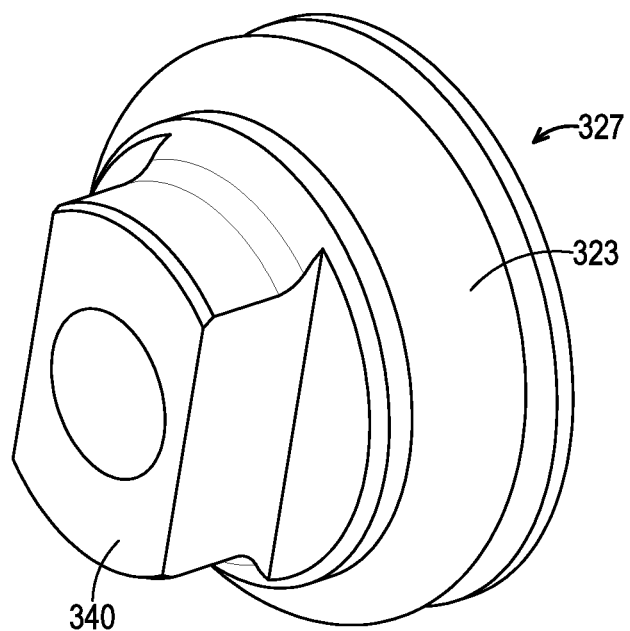
FIG. 15 is an isometric view of an illustrative valve plug suitable for use with the third illustrative valve of FIG. 11.

Valve stem 120 (AKA valve rod) is depicted in FIG. 7. Valve stem 120 includes an elongate valve shaft 121 including threaded end 150 at a distal end and a circumferential channel 153 formed in a valve plug 127 at a proximal end. Valve stem 120 may comprise any suitably rigid and durable material, such as brass, aluminum, copper, steel, titanium, plastic, composite, and/or the like.

Threaded end 150 includes an enlarged portion of the stem having threads 152 configured to mate with internal threads 135 of cap 130. Threads 152 may be relatively coarse, for increased durability. However, coarse threads result in a larger stem diameter than fine threads, which may impede air flow through the valve. Threaded end 150 may be trimmed to remove portions of threads 152, so that threaded regions are disposed between flat regions 154. In some examples, threads 152 are trimmed bi-laterally, creating two parallel flat regions. In some examples, 66% of threaded end 150 comprises flat regions. In some examples, 25%, 33%, 50% or 75% of threaded end 150 comprises flat regions. Flat regions 154 may extend a length of threaded end 150. In some examples, threaded end 150 includes grooves, recesses, or channels 156 formed on surfaces of flat regions 154. Grooves 156 may be configured to further reduce a cross-sectional profile of threaded end 150, increasing air flow.

Channel 153 is configured to receive a resilient seating member 123 forming seating surface 122. In some examples, resilient seating member 123 comprises an O-ring. In some examples, the resilient seating member comprises a gasket having any suitable cross-sectional profile, such as circular, square, rectangular, elliptical, u-shaped, v-shaped, x-shaped, and/or the like. Resilient seating member 123 may comprise rubber, resilient polymer, and/or any suitable resilient material. Valve plug 127 and resilient seating member 123 collectively block air flow through valve body 110 when the valve is in the closed position. Stem 120 further includes a polygonal socket 128 disposed on a proximal surface of valve plug 127. In some examples, the polygonal socket may be hexagonal and configured to receive an Allen key. The polygonal socket may allow for removal of the valve seat and stem, e.g., for valve cleaning.

Some further examples of valve stem 120 are listed below. In some examples, valve stem 120 is coupled to cap 130 and has a threaded connection with valve plug 127. In some examples, valve stem 120 includes multiple discrete components. In some examples, valve stem 120 is hollow and has air ports to increase air flow. In some examples, threads 154 of threaded end 150 are fine, and threaded end 150 is cylindrical without flat regions. In some examples, valve stem 120 is replaced by a sliding ball and/or a piston. In some examples, the ball or piston protrude from the valve body, allowing a user to discharge air from the valve by pressing on the ball or piston.

In examples where threaded end 150 of stem 120 includes parallel flat regions, the valve stem may be manufactured by stamping the thread profile from a thin sheet of metal. This stamping process may produce similar flow characteristics to a machined valve stem, while being significantly less expensive. Stamping the thread profile may also include producing one or more anti-rotation features.

B. First Illustrative Tire Inflation Valve

As shown in FIGS. 7-10, this section describes an illustrative tire inflation valve 200 including one or more anti-rotation features. Valve 200 may be substantially identical to valve 100, except as otherwise described. Valve 200 is configured to be installed in a bicycle rim as illustrated in FIG. 1, described above.

Valve 200 is transitionable between a closed position and an open position. Valve 200 includes a valve body 210 defining an internal cavity 212 and a valve stem 220 (AKA valve rod), which extends continuously through and is movable within the valve cavity. When valve 200 is in the closed position, a resilient seating surface 222 disposed at a proximal end 272 of the valve stem mates with a valve seat 268 disposed at a proximal end 208 of the valve body, sealing the proximal end of the valve. When the valve is in the open position, seating surface 222 is spaced apart from valve seat 268 (in a direction generally toward the tire), enabling a flow of air through the valve.

Valve stem 220 includes a channel 253 configured to receive a resilient seating member 223 forming seating surface 222. In some examples, resilient seating member 223 comprises an O-ring. In some examples, the resilient seating member comprises a gasket having any suitable cross-sectional profile, such as circular, square, rectangular, elliptical, u-shaped, v-shaped, x-shaped, and/or the like. Resilient seating member 223 may comprise rubber, resilient polymer, and/or any suitable resilient material. Valve plug 227 and resilient seating member 223 collectively block air flow through valve body 210 when the valve is in the closed position. In some examples, stem 220 further includes a polygonal socket disposed on a proximal surface of valve plug 227. In some examples, the polygonal socket may be hexagonal and configured to receive an Allen key. The polygonal socket may allow for removal of the valve seat and stem, e.g., for valve cleaning.

As the OD of valve seat 268 is larger than the ID of valve body 210, air flow through the valve body is not restricted by the valve seat. In some examples, walls of valve body 210 extend beyond the valve seat, and include a slot 220 disposed proximal to the valve seat. In some examples, slot 220 has any suitable shape which has two equal axes, such as a square, rectangle, lozenge, rhombus, and/or the like. In some examples, slot 220 has any suitable elongate shape which has a long axis and a short axis, such as an ellipse, oval, rectangle, stadium-shape, and/or the like. In some examples, a long axis of slot 220 is disposed parallel to a proximal edge 214 of the valve body. Slot 220 may have any suitable length in relation to a circumference of the valve body, such as half the circumference of the valve body, one third the circumference of the valve body, one fourth the circumference of the valve body, one sixth the circumference of the valve body, and/or the like.

Slot 220 is one feature included in one or more anti-rotation features 230 included within valve 200. Anti-rotation features 230 collectively prevent or reduce rotation of the valve stem when the valve is in use. In some examples, the anti-rotation features may restrict movement of the valve stem to a selected range of motion. In some examples, the anti-rotation features may reversibly couple the valve stem to the valve body.

Anti-rotation features 230 include slot 220 and a protrusion (AKA flange and/or tang) 232, which extends through slot 220. Protrusion 232 extends radially from a proximal end of valve plug 227 exterior to resilient seating surface 222. Protrusion 232 may be substantially flat, and may extend parallel to an external surface of the valve plug. The protrusion is received by the slot, such that the protrusion contacts edges of the slot when the valve stem is laterally translated or rotated within the valve cavity to boundaries of a range of motion defined by the slot. Accordingly, a long axis of the slot may correspond to a rotational range of motion of the valve stem and a short axis of the slot may correspond to an axial range of motion of the valve stem (e.g., along an axis defined by the valve stem). The slot and protrusion may collectively restrict rotation of the valve stem, as well as limit a lateral range of motion of the valve stem.

The slot and protrusion may additionally secure the valve stem to the valve body. In some examples, the valve stem is coupled to the valve body by a threaded insert 264 disposed at the proximal end of the valve body. For example, the threaded insert may include the slot, and removing the threaded insert from the valve body may uncouple the valve stem from the valve body. Exterior threads of threaded insert 264 may mate with interior threads disposed on an interior surface of valve body 210. Threaded insert 264 includes valve seat 268, which is disposed exterior to valve body 210 at the proximal end. Valve seat 268 has a larger OD than an ID of valve body 210, facilitating increased air flow through the valve. Insert 264 may include a channel configured to hold an O-ring or other resilient sealing member. In some examples, the threaded insert also includes a portion external to the valve body on which the valve seat is formed.

C. Second Illustrative Tire Inflation Valve

As shown in FIGS. 11-15, this section describes an illustrative tire inflation valve 300 including one or more anti-rotation features. Valve 300 may be substantially identical to valves 100 and 200, except as otherwise described. Valve 300 is configured to be installed in a bicycle rim as illustrated in FIG. 1, described above.

Valve 300 is transitionable between a closed position and an open position. Valve 300 includes a valve body 310 defining an internal cavity 312 and a valve stem 320 (AKA valve rod), which extends continuously through and is movable within the valve cavity. When valve 300 is in the closed position, a resilient seating surface 322 disposed at a proximal end 372 of the valve stem mates with a valve seat 368 disposed at a proximal end 308 of the valve body, sealing the proximal end of the valve. When the valve is in the open position, seating surface 322 is spaced apart from valve seat 368 (in a direction generally toward the tire), enabling a flow of air through the valve.

As the OD of valve seat 368 is larger than the ID of valve body 310, air flow through the valve body is not restricted by the valve seat. In some examples, valve body 310 includes a keyway 370 which is set behind valve seat 368 and is configured to receive a protruding ridge 340. Keyway 370 may comprise a recess, trench, and/or channel which has a complementary shape to protruding ridge 340. Keyway 370 may have any suitable elongate profile, such as rectangular, ovular, elliptical, bulging elliptical (e.g., like an edge-on spiral galaxy), and/or the like. Generally, the protruding ridge and the keyway have no more than two axes of symmetry, such that the protruding ridge may only be received within the keyway at two different orientations, which are 180° rotations of each other. Accordingly, the protruding ridge and the keyway may collectively restrict orientation of the valve stem to two positions when the resilient seating surface is directly contacting the valve seat.

Valve stem 320 includes a channel 353 configured to receive a resilient seating member 323 forming seating surface 322. In some examples, resilient seating member 323 comprises an O-ring. In some examples, the resilient seating member comprises a gasket having any suitable cross-sectional profile, such as circular, square, rectangular, elliptical, u-shaped, v-shaped, x-shaped, and/or the like. Resilient seating member 323 may comprise rubber, resilient polymer, and/or any suitable resilient material. Valve plug 327 and resilient seating member 323 collectively block air flow through valve body 310 when the valve is in the closed position. In some examples, a distal surface of valve plug 327 includes a protruding ridge 340 disposed interior to the resilient seating member. The protruding ridge 340 may comprise a key, which is configured to be received by a complementary keyway (AKA recess) 370 disposed at the valve seat 368. Protruding ridge 340 may have any suitable elongate profile, such as rectangular, ovular, elliptical, bulging elliptical (e.g., like an edge-on spiral galaxy), and/or the like. Protruding ridge 340 may be formed by any suitable process, such as molding, die-casting, extruding, swaging, and/or the like.

D. Third Illustrative Tire Inflation Valve

Figure 16:
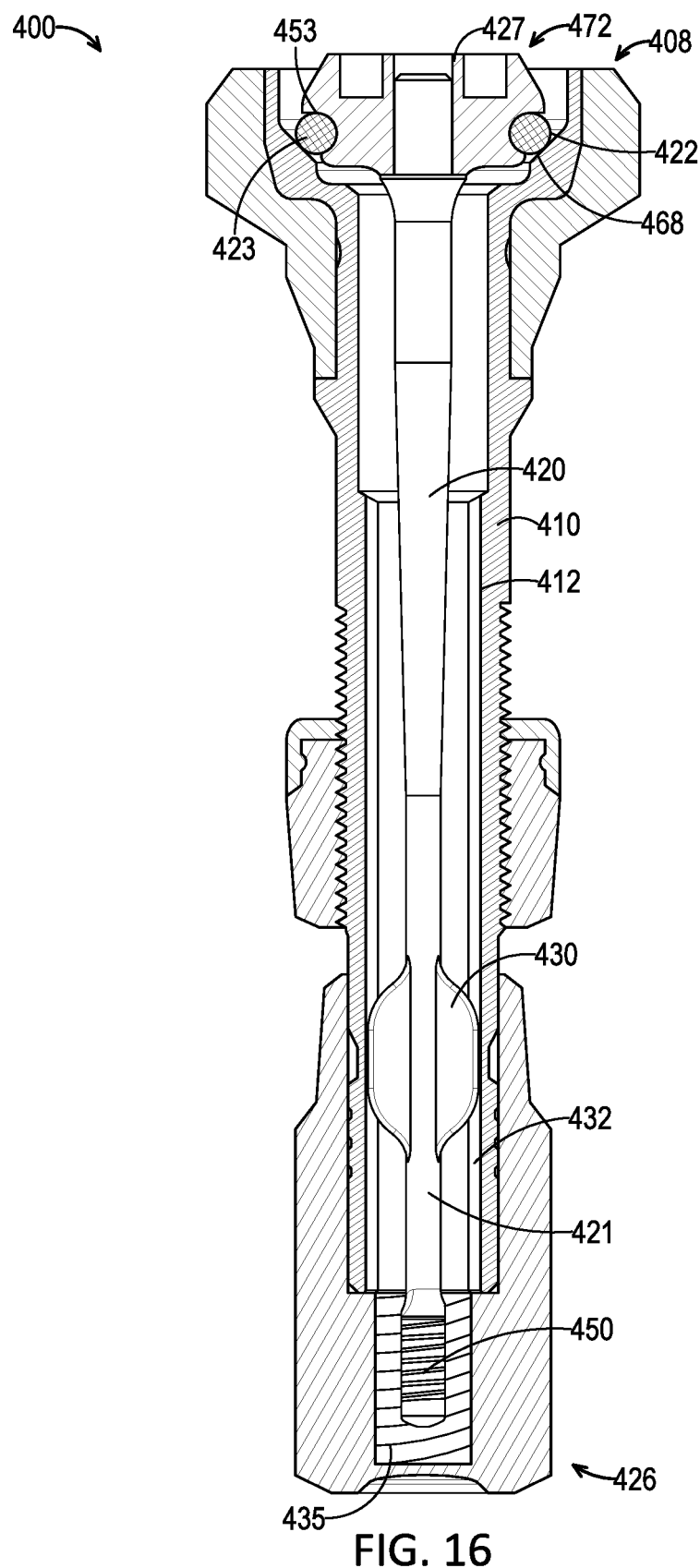
FIG. 16 is a sectional view of a fourth illustrative tire valve.
Figure 17:
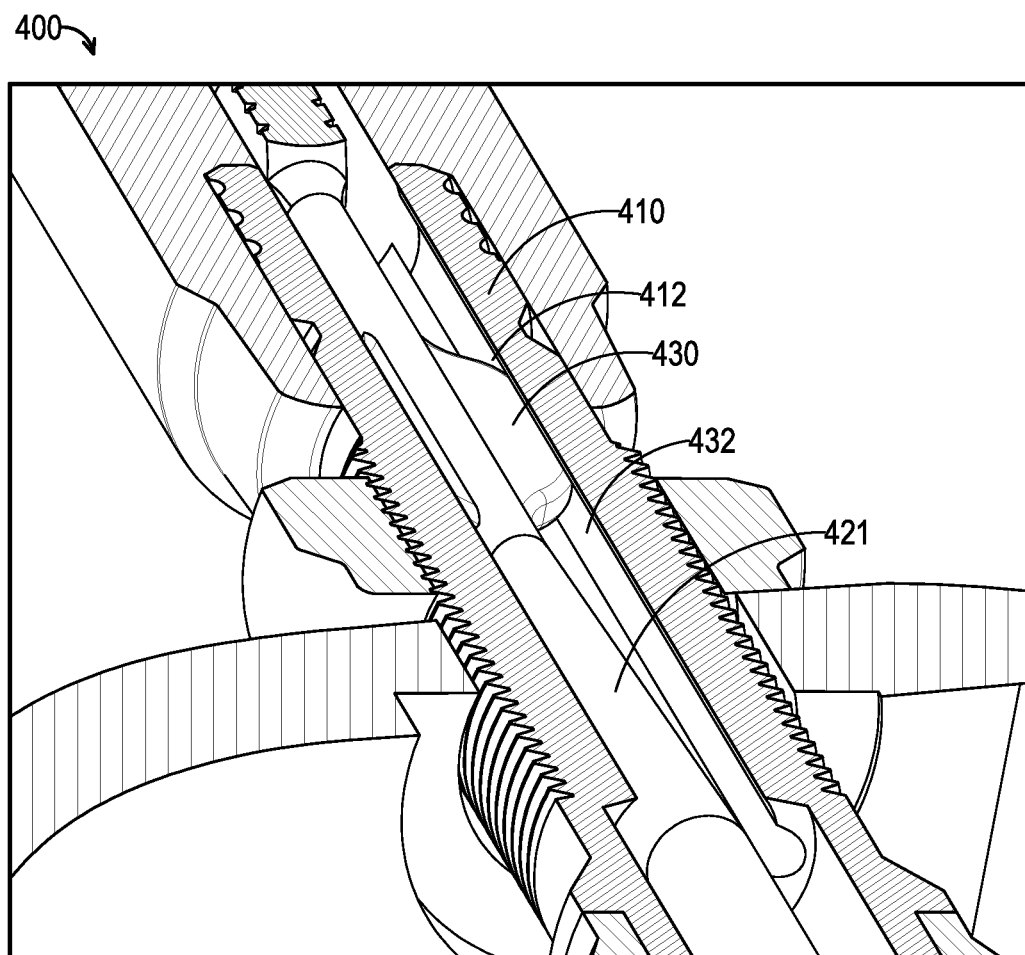
FIG. 17 is a partial sectional view of an illustrative anti-rotation feature of the fourth illustrative tire valve of FIG. 16.
Figure 18:
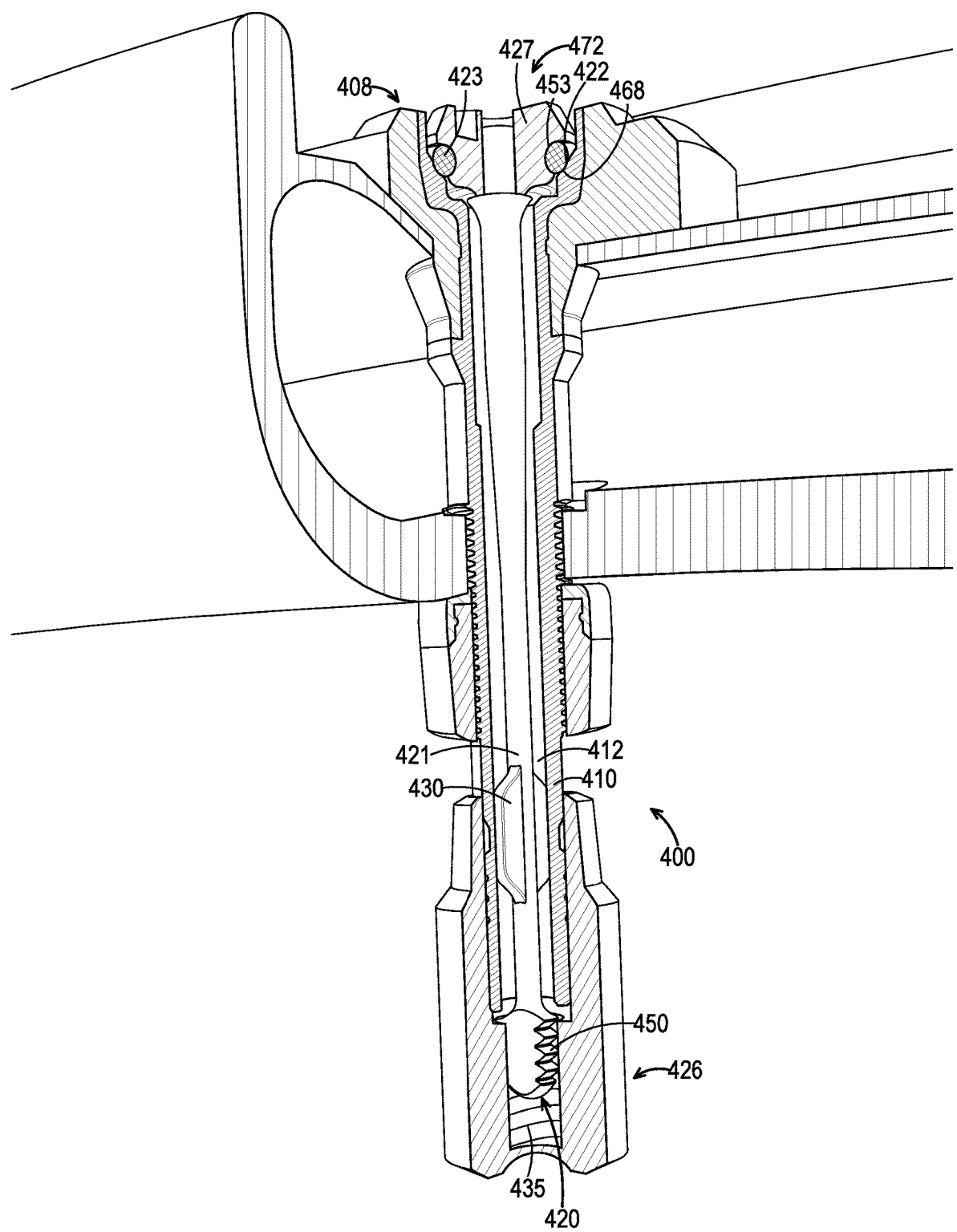
FIG. 18 is a sectional isometric view of the fourth illustrative tire valve of FIG. 16, seated within a tubeless bicycle tire.
Figure 19:
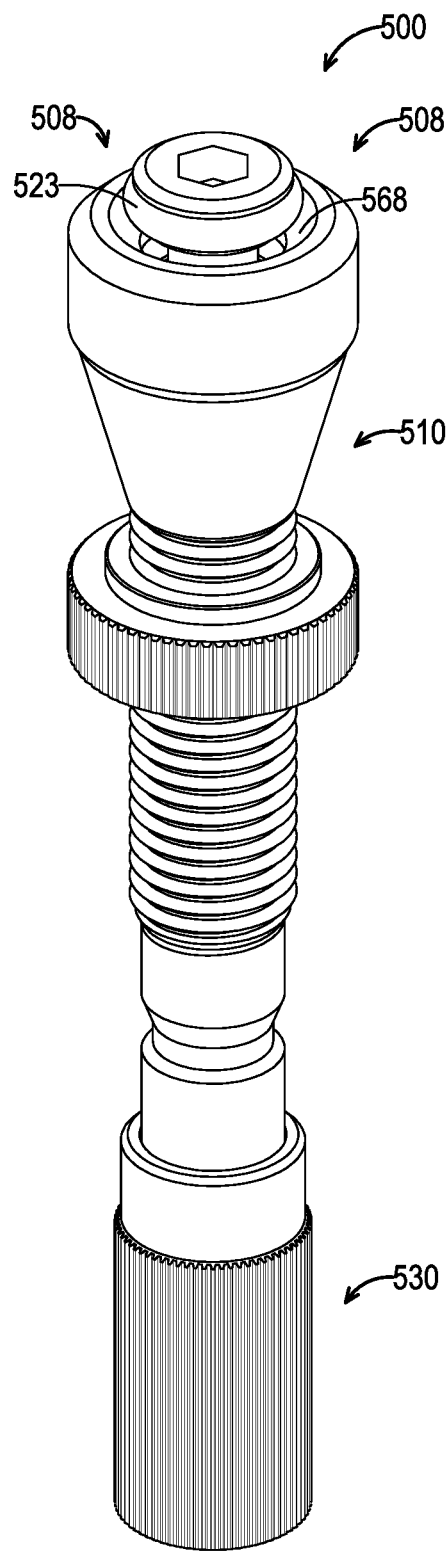
FIG. 19 is an isometric view of a fifth illustrative tire valve.

As shown in FIGS. 16-18, this section describes an illustrative tire inflation valve 400 including one or more anti-rotation features. Valve 400 may be substantially identical to valves 100, 200, and/or 300, except as otherwise described. Valve 400 is configured to be installed in a bicycle rim, as illustrated in FIG. 16.

Valve 400 is transitionable between a closed position and an open position. Valve 400 includes a valve body 410 defining an internal cavity 412 and a valve stem 420 (AKA valve rod), which extends continuously through and is movable within the valve cavity. When valve 400 is in the closed position, a resilient seating surface 422 disposed at a proximal end 472 of the valve stem mates with a valve seat 468 disposed at a proximal end 408 of the valve body, sealing the proximal end of the valve. When the valve is in the open position, seating surface 422 is spaced apart from valve seat 468 (in a direction generally toward the tire), enabling a flow of air through the valve.

Valve 400 includes a removable cap 426, which covers the distal end of the valve stem. Air may be released from the valve while the cap is coupled to the valve, and the cap is removable to permit inflation through the valve. Cap 426 includes internal threads 435 which are configured to mate with a threaded end 450 of valve stem 420.

Valve stem 420 includes a channel 453 configured to receive a resilient seating member 423 forming seating surface 422. In some examples, resilient seating member 423 comprises an O-ring. In some examples, the resilient seating member comprises a gasket having any suitable cross-sectional profile, such as circular, square, rectangular, elliptical, u-shaped, v-shaped, x-shaped, and/or the like. Resilient seating member 423 may comprise rubber, resilient polymer, and/or any suitable resilient material. Valve plug 427 and resilient seating member 423 collectively block air flow through valve body 410 when the valve is in the closed position. In some examples, stem 420 further includes a polygonal socket disposed on a proximal surface of valve plug 427. In some examples, the polygonal socket may be hexagonal and configured to receive an Allen key. The polygonal socket may allow for removal of the valve seat and stem, e.g., for valve cleaning.

In some examples, valve stem 420 includes one or more protrusions (AKA flanges) 430 extending laterally along an elongate valve shaft 421 of the valve stem. Protrusions 430 may have an elongate or flattened shape, with a long axis of the protrusion extending parallel to an axis defined by the elongate valve shaft. Protrusions 430 may have any suitable elongate or flattened shape, such as rectangular, stadium shaped, ovular, oblong, paddle shaped, and/or the like. Protrusions 430 may be spaced around a circumference of the elongate valve shaft. In some examples, protrusions 430 are equally spaced around the elongate valve shaft. Valve stem 420 may include any suitable number of protrusions, such as two, three, four, and/or the like. Protrusions 430 may be disposed along any portion of the elongate valve shaft of the valve stem. In some examples, the protrusions are disposed closer to the threaded end of the valve stem than to the proximal end of the valve stem.

Valve body 410 may include complementary channels 432 extending along interior walls of the valve body. In some examples, complementary channels 432 extend the entire length of the valve body. Each complementary channel may be configured to slidably receive one of the protrusions 430. Accordingly, valve 400 includes a number of channels 432 equivalent to the number of protrusions 430. In some examples, the anti-rotation features comprise a pair of protrusions and a pair of slots. In some examples, the anti-rotation features comprise three protrusions and three slots.

The protrusions slide within their respective channels as the valve stem is laterally translated. Accordingly, the channels and protrusions collectively restrict rotation of the valve stem, such that the valve stem may be restricted to lateral motion within the valve cavity.

E. Fourth Illustrative Tire Inflation Valve

As shown in FIGS. 19-24, this section describes an illustrative tire inflation valve 500 including one or more anti-rotation features. Valve 500 may be substantially identical to valves 100, 200, 300 and/or 400, except as otherwise described. Valve 500 is configured to be installed in a bicycle rim as illustrated in FIG. 1, described above.

Valve 500 is transitionable between a closed position and an open position. Valve 500 includes a valve body 510 defining an internal cavity 512 and a valve stem 520 (AKA valve rod), which extends continuously through and is movable within the valve cavity. When valve 500 is in the closed position, a resilient seating surface 522 disposed at a proximal end 572 of the valve stem mates with a valve seat 568 disposed at a proximal end 508 of the valve body, sealing the proximal end of the valve. When the valve is in the open position, seating surface 522 is spaced apart from valve seat 568 (in a direction generally toward the tire), enabling a flow of air through the valve.

Figure 20:
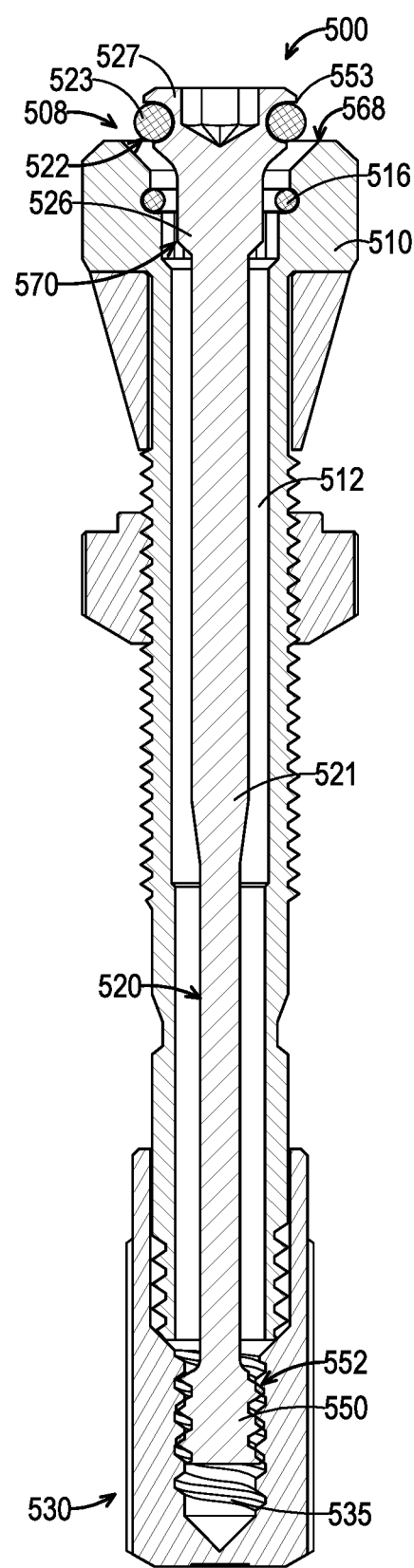
FIG. 20 is a front sectional view of the fifth illustrative tire valve of FIG. 19.
Figure 21:
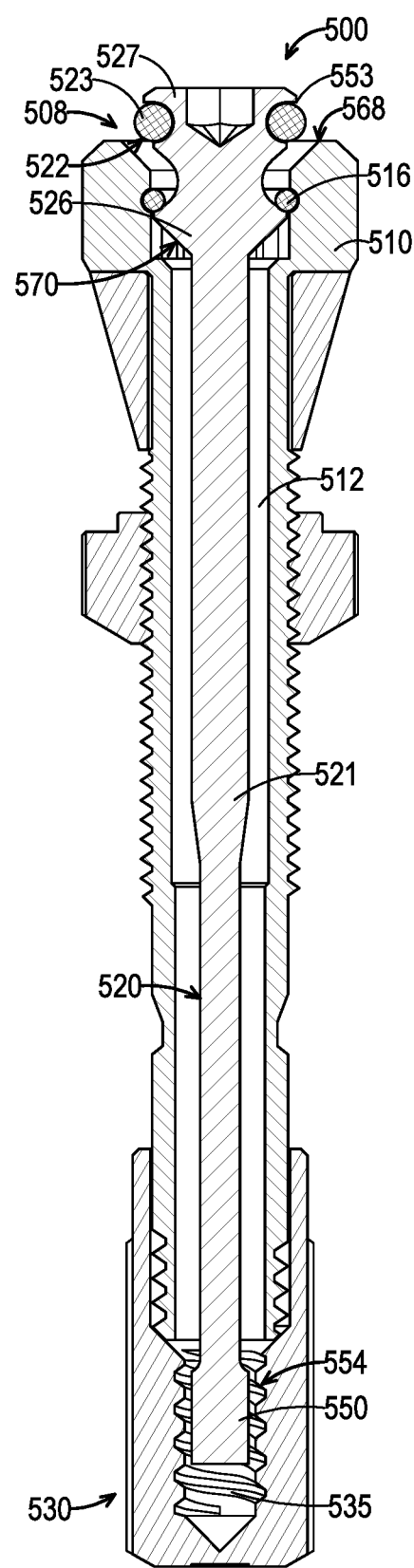
FIG. 21 is a side sectional view of the fifth illustrative tire valve of FIG. 19.
Figure 22:
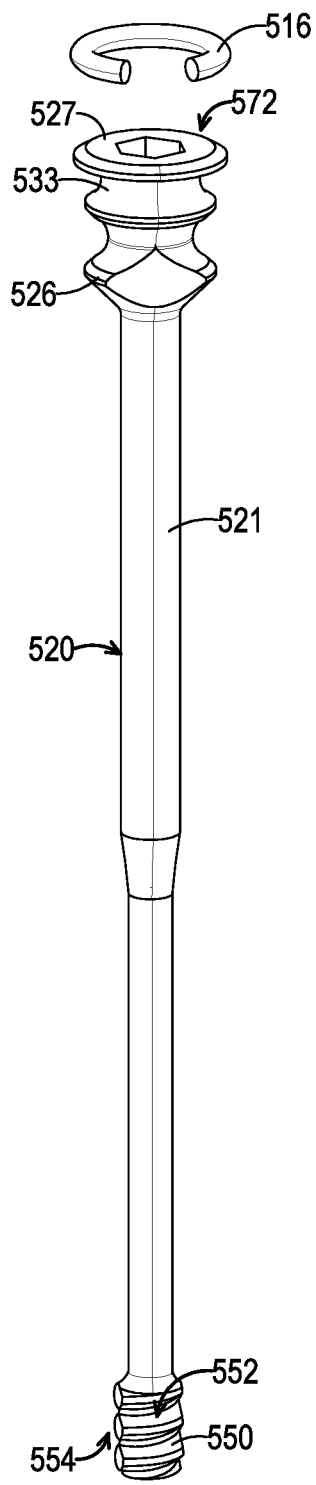
FIG. 22 is a partial exploded view of the fifth illustrative tire valve of FIG. 19, depicting a valve stem and a circlip.
Figure 23:
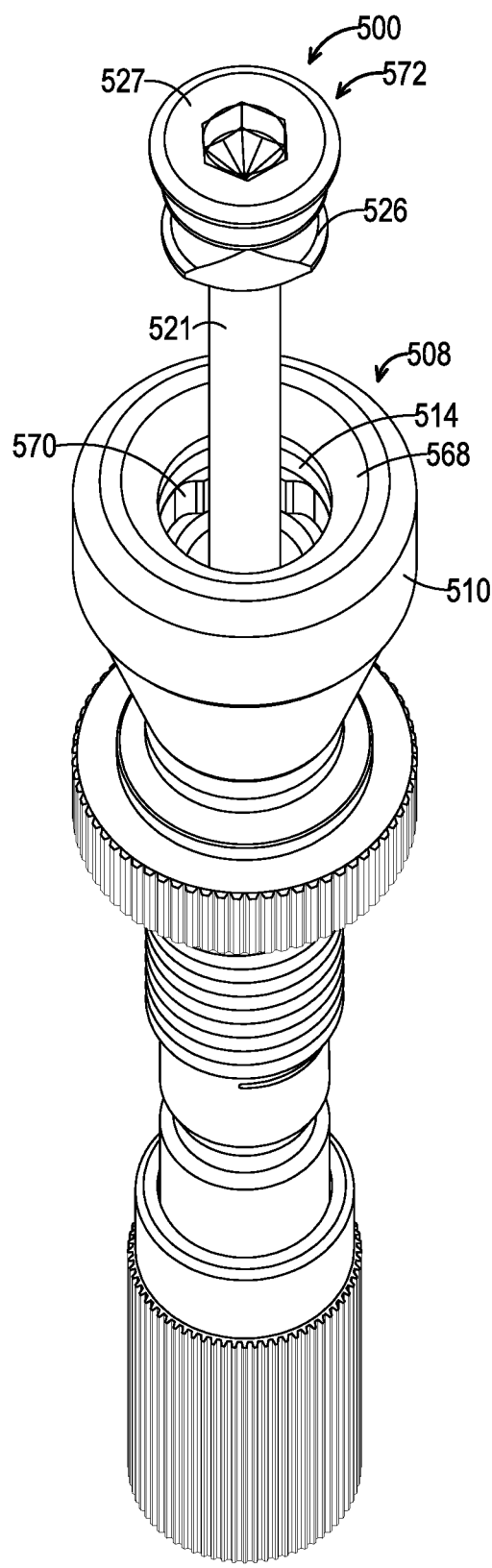
FIG. 23 is a partial exploded view of the fifth illustrative tire valve of FIG. 19.
Figure 24:
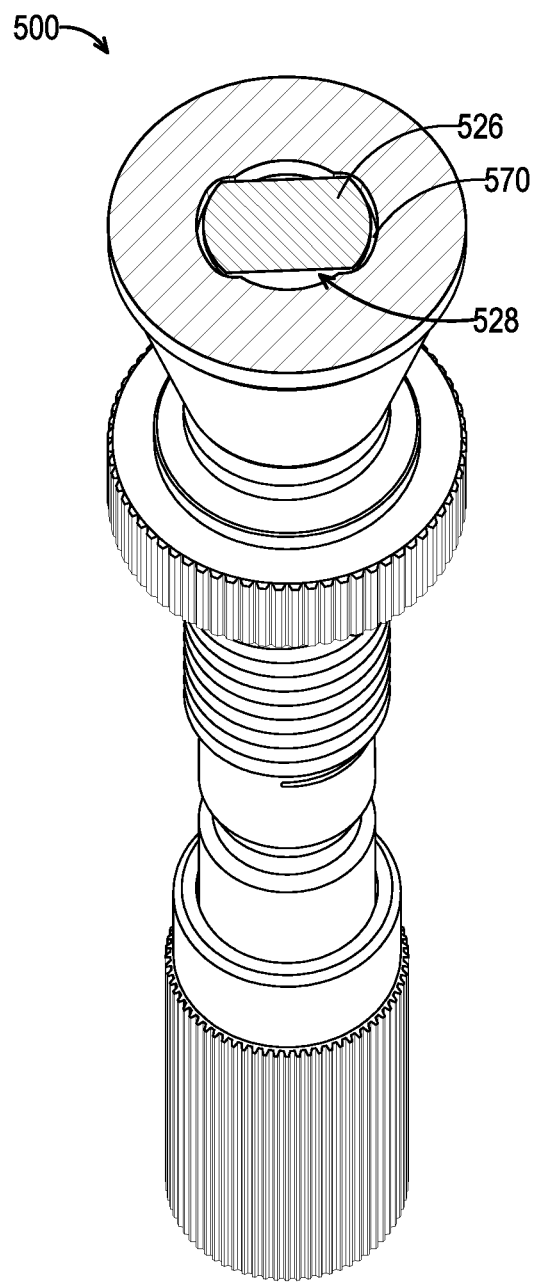
FIG. 24 is a top partial sectional view of the fifth illustrative tire valve of FIG. 19.
Figure 25:
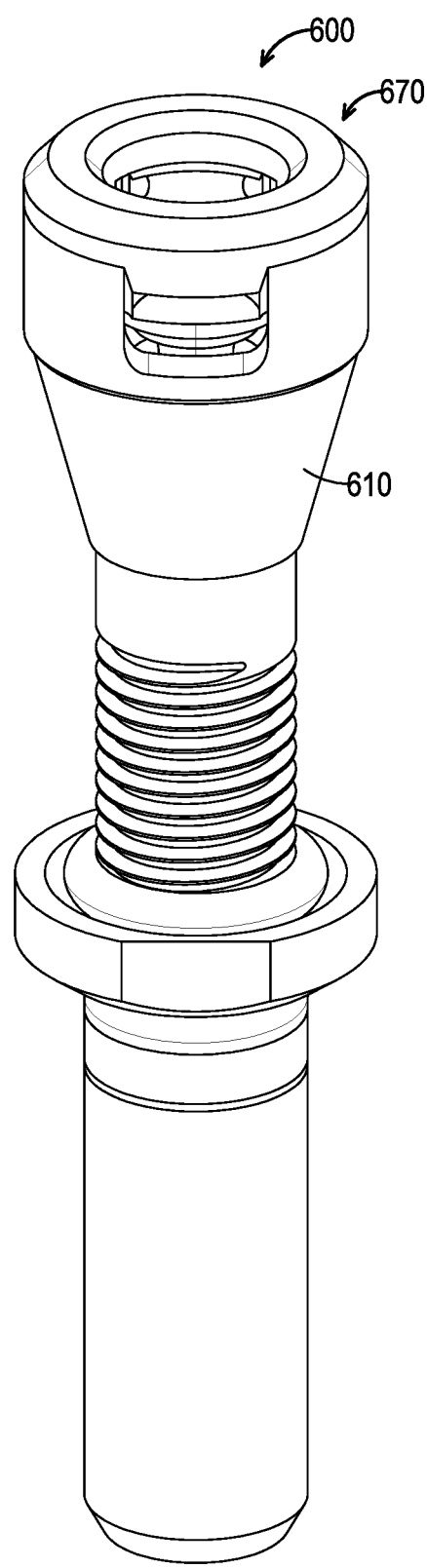
FIG. 25 is an isometric view of a sixth illustrative tire valve.
Figure 26:
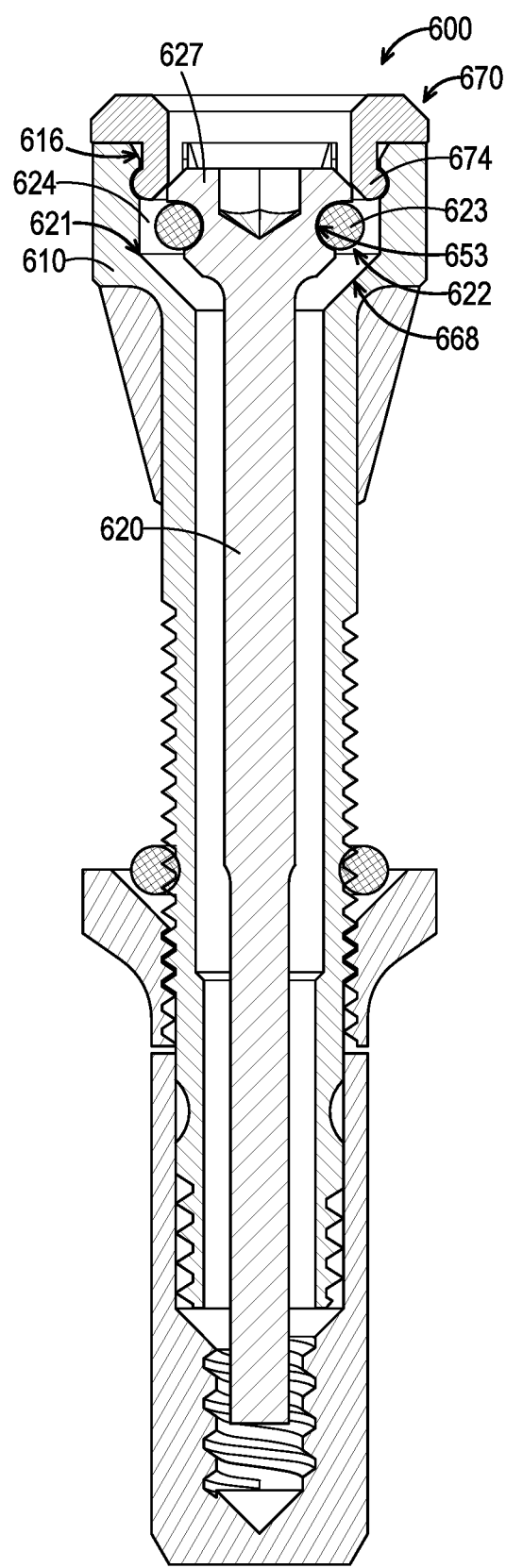
FIG. 26 is a front sectional view of the sixth illustrative tire valve of FIG. 25.
Figure 27:
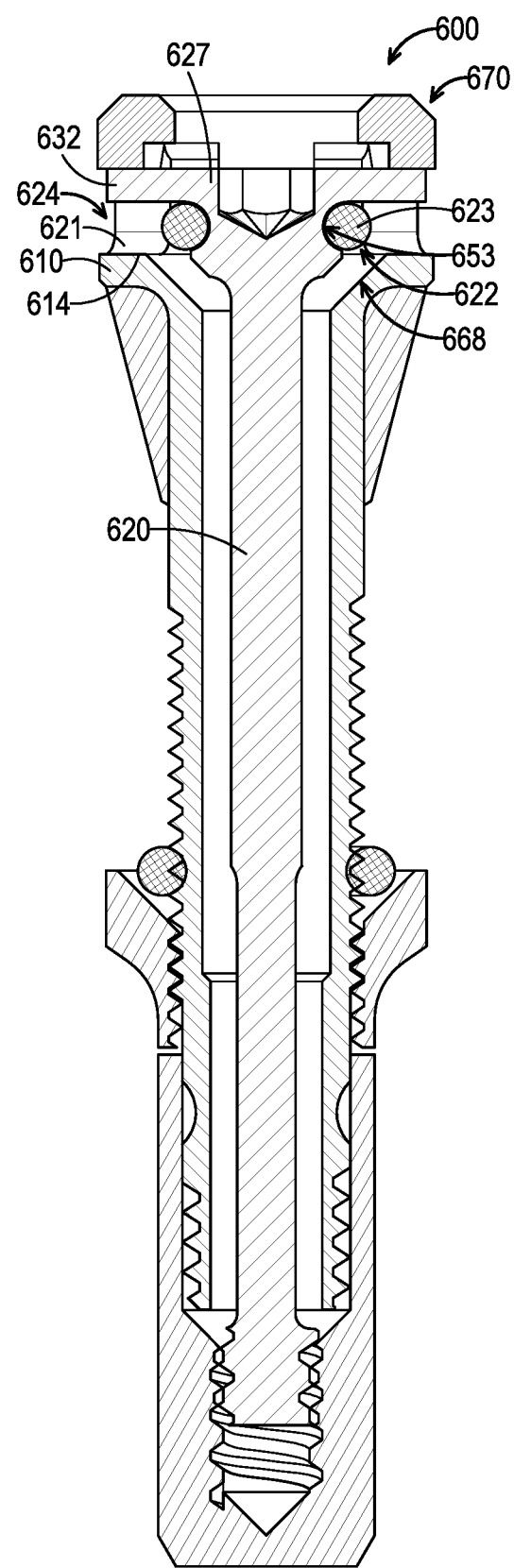
FIG. 27 is a side sectional view of the sixth illustrative tire valve of FIG. 25.
Figure 28:
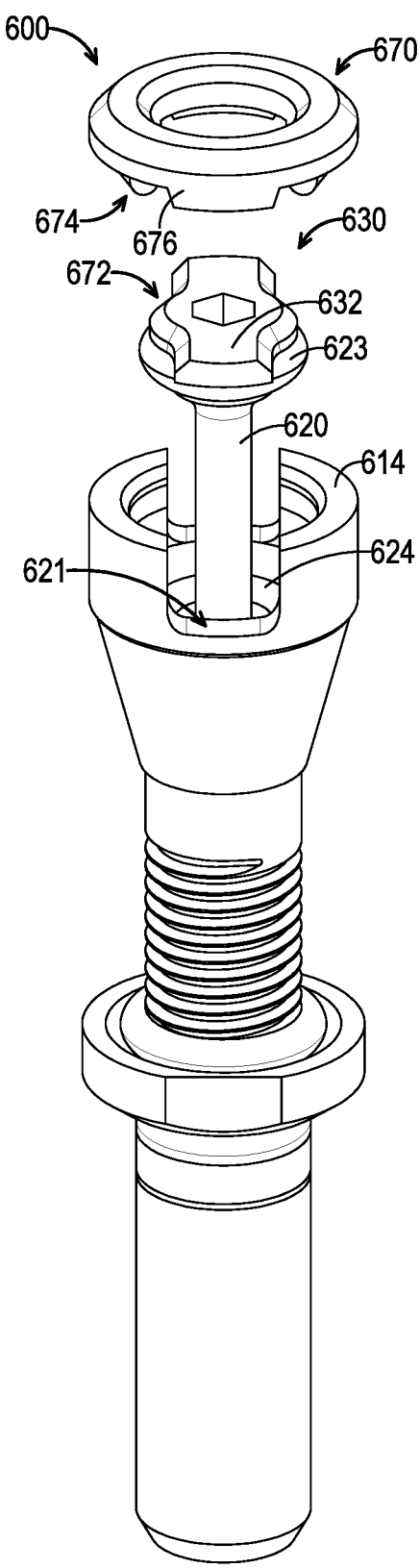
FIG. 28 is a front partial exploded view of the sixth illustrative tire valve of FIG. 25
Figure 29:
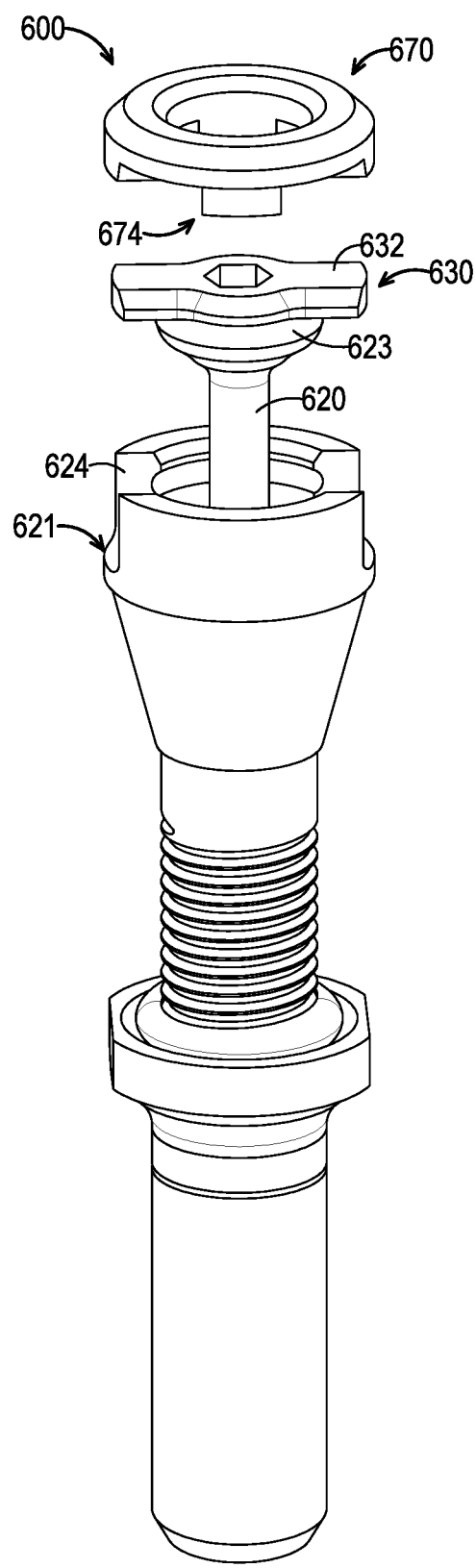
FIG. 29 is a side partial exploded view of the sixth illustrative tire valve of FIG. 25
Figure 30:
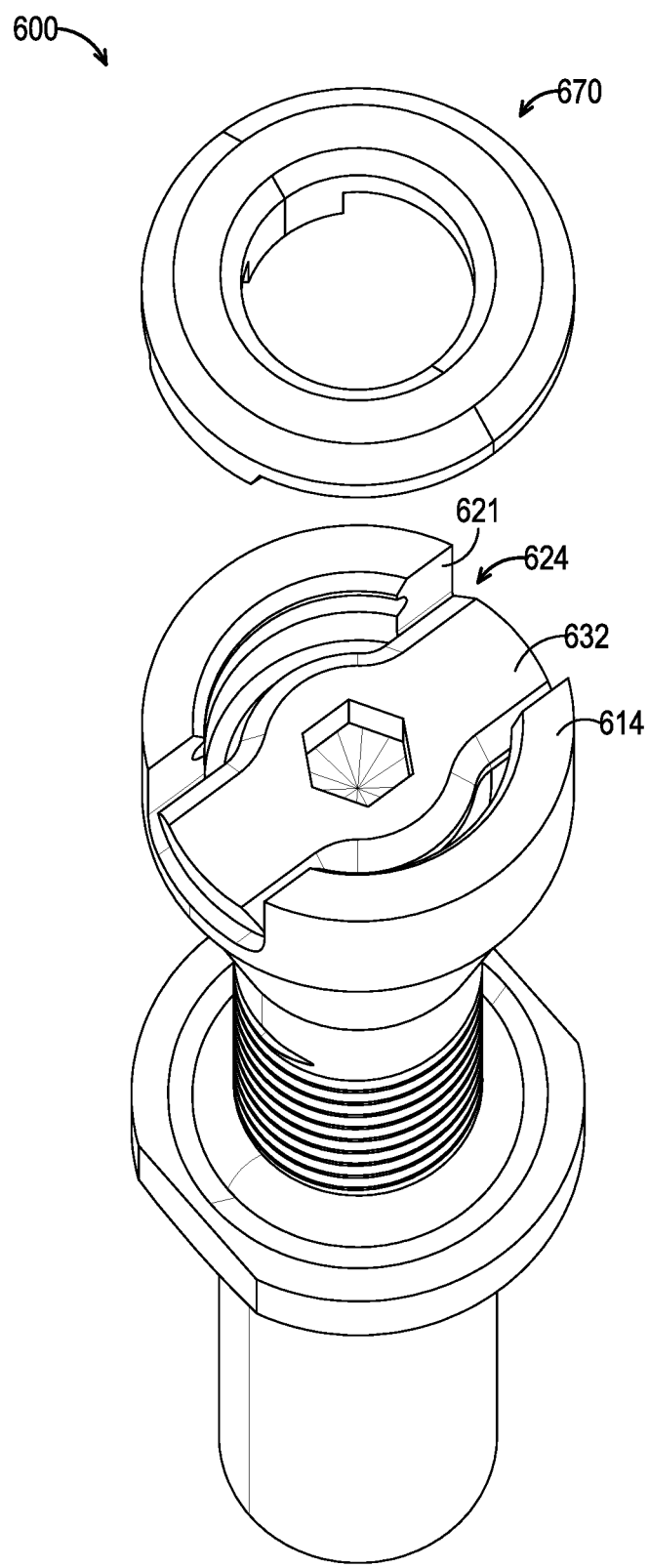
FIG. 30 a top isometric partial exploded view of the sixth illustrative tire valve of FIG. 25.

As depicted in FIGS. 20-21, valve stem 520 includes an elongate valve shaft 521 including a threaded end 550 at a distal end and circumferential channel 553 configured to receive a resilient seating member 523 forming seating surface 522 at a proximal end. In some examples, resilient seating member 523 comprises an O-ring. In some examples, the resilient seating member comprises a gasket having any suitable cross-sectional profile, such as circular, square, rectangular, elliptical, u-shaped, v-shaped, x-shaped, and/or the like. Resilient seating member 523 may comprise rubber, resilient polymer, and/or any suitable resilient material. Valve plug 527 and resilient seating member 523 collectively block airflow through valve body 510 when the valve is in the closed position. In some examples, valve stem 520 may include one or more radial protrusion(s) 526, which may form a key configured to be received by a complementary recess (AKA keyway) 570 disposed within valve body 510. In some examples, radial protrusion 526 may have an elongate lateral cross-section (see FIG. 24), which may have any suitable elongate shape such as rectangular, ovular, elliptical, bulging elliptical (e.g., like an edge-on spiral galaxy), stadium shaped, and/or the like. In some examples, radial protrusion 526 may be an annular (i.e., circular) protrusion and/or ridge which has been cut, sliced, and/or swaged to provide an elongate shape. Radial protrusion 526 may have a pointed and/or tapered circumferential edge 528, wherein radial protrusion 526 is thinner at the circumferential edge and thicker at the center of radial protrusion 526.

Threaded end 550 includes an enlarged portion of the stem having threads 552 configured to mate with internal threads 535 of cap 530. Threaded end 550 may be trimmed to remove portions of threads 552, so that threaded regions are disposed between flat regions 554. In some examples, threads 552 are trimmed bi-laterally, creating two parallel flat regions. In some examples, 66% of threaded end 550 comprises flat regions. In some examples, 25%, 33%, 50% or 75% of threaded end 550 comprises flat regions. Flat regions 554 may extend a length of threaded end 550. In some examples, a cross-sectional long axis of threaded end 550 may be oriented at a 90 degree angle with respect to a long axis of radial protrusion 526. In some examples, the cross-sectional long axis of the threaded end may be substantially parallel to the long axis of radial protrusion 526.

In some examples, stem 520 further includes a polygonal socket disposed on a proximal surface of valve plug 527. In some examples, the polygonal socket may be hexagonal and configured to receive an Allen key. The polygonal socket may allow for removal of the valve seat and stem, e.g., for valve cleaning.

Valve body 510 includes an elongate recess or keyway 570 disposed between proximal end 508 of valve body 510 and a distal end of the valve body. Elongate recess 570 may comprise a recess, trench, and/or channel which has a complementary shape to radial protrusion 526. Elongate recess 570 may have any suitable elongate profile, such as rectangular, ovular, elliptical, bulging elliptical (e.g., like an edge-on spiral galaxy), stadium shaped, and/or the like. Elongate recess 570 is configured to receive keyed radial protrusion 526, providing a lower limit for axial movement of the valve stem. Generally, the radial protrusion and the elongate recess have no more than two axes of symmetry, such that the radial protrusion may only be received within the elongate recess at two different orientations, which are 180° rotations of each other. Accordingly, the radial protrusion and the elongate recess may collectively restrict the valve stem to two possible orientations when the valve is closed (e.g., when the resilient seating member is contacting valve seat 568 and radial protrusion 526 is received by elongate recess 570).

Valve body 510 further includes a circumferential channel 514 which is set behind valve seat 568. Circumferential channel 514 is configured to receive a c-clip, circlip, or snap ring 516, which provides an upper limit for axial movement of the valve stem. Accordingly, radial protrusion 526 may contact snap ring 516 when the valve is in the open position, and may contact elongate recess 570 when the valve is in the closed position. Snap ring 516 may comprise any suitable resilient metallic material, such as steel, aluminum, and/or the like. Snap ring 516 may include a ring of metallic wire, having a gap between two ends, allowing the two ends to be compressed toward each other, decreasing the circumference of the ring and facilitating insertion into the circumferential channel. In some examples, removing snap ring 516 may facilitate removal of the valve stem from the valve body.

F. Fifth Illustrative Tire Inflation Valve

As shown in FIGS. 25-30, this section describes an illustrative tire inflation valve 600 including one or more anti-rotation features. Valve 600 may be substantially identical to valves 100, 200, 300, 400, and 500, except as otherwise described. Valve 600 is configured to be installed in a bicycle rim as illustrated in FIG. 1, described above.

Valve 600 is transitionable between a closed position and an open position. Valve 600 includes a valve body 610 defining an internal cavity 512 and a valve stem 520 (AKA valve rod), which extends continuously through and is movable within the valve cavity. When valve 600 is in the closed position, a resilient seating surface 622 disposed at a proximal end 673 of the valve stem mates with a valve seat 668 disposed at a proximal end 608 of the valve body, sealing the proximal end of the valve. When the valve is in the open position, seating surface 622 is spaced apart from valve seat 668 (in a direction generally toward the tire), enabling a flow of air through the valve.

Valve stem 620 includes a channel 653 configured to receive a resilient seating member 623 forming seating surface 622. In some examples, resilient seating member 623 comprises an O-ring. In some examples, the resilient seating member comprises a gasket having any suitable cross-sectional profile, such as circular, square, rectangular, elliptical, u-shaped, v-shaped, x-shaped, and/or the like. Resilient seating member 623 may comprise rubber, resilient polymer, and/or any suitable resilient material. Valve plug 627 and resilient seating member 623 collectively block air flow through valve body 610 when the valve is in the closed position. In some examples, stem 620 further includes a polygonal socket disposed on a proximal surface of valve plug 627. In some examples, the polygonal socket may be hexagonal and configured to receive an Allen key. The polygonal socket may allow for removal of the valve seat and stem, e.g., for valve cleaning.

As the OD of valve seat 668 is larger than the ID of valve body 610, air flow through the valve body is not restricted by the valve seat. In some examples, walls of valve body 610 extend beyond the valve seat, and include a pair of slots, channels, and/or recesses 624 disposed proximate the valve seat. Slots 624 oppose each other, such that the slots provide a channel directly through the valve body. In some examples, each of slots 624 have any suitable shape having two equal axes, such as square, rectangle, lozenge, rhombus, and/or the like. In some examples, each of the slots 624 have any suitable elongate shape having a long axis and a short axis, such as an ellipse, oval, rectangle, stadium-shape, and/or the like. In some examples, a long axis of slots 624 is disposed parallel to a proximal edge 614 of the valve body. Slots 624 may have any suitable length in relation to a circumference of the valve body, such as half the circumference of the valve body, one third the circumference of the valve body, one fourth the circumference of the valve body, one sixth the circumference of the valve body, and/or the like.

In some examples, slots 624 are collectively formed by notches 621 formed in walls of valve body 610 and a removable cap 670, which is configured to be received by the proximal end of valve body 610. In some examples, a bottom (AKA distal) edge and side edges of slots 624 are formed by valve body 610, and a top (AKA proximal) edge of slots 624 are formed by removable cap 670. Removable cap 670 may comprise a ring of material including an internal hole and/or aperture 672 through which air may flow when the valve is in the open position. Removable cap 670 may include cantilevered protrusions 674 extending from a bottom edge of the removable cap, which are configured to snap beneath an overhanging lip 616 disposed at a proximal edge of the valve body in a cantilevered snap-fit. In some examples, removable cap 670 includes two cantilevered protrusions 674, which are disposed opposite each other. In some examples, removable cap 670 includes two castellations 676 which are configured to be received by notches 621. Accordingly, castellations 676 form the top edges of slots 624. Removable cap 670 may comprise any suitable material, such as plastics, rigid polymers, resins, natural and/or synthetic rubbers, and/or the like.

Slots 624 are one feature included in one or more anti-rotation features 630 included within valve 600. Anti-rotation features 630 collectively prevent or reduce rotation of the valve stem when the valve is in use. In some examples, the anti-rotation features may restrict movement of the valve stem to a selected range of motion. In some examples, the anti-rotation features may reversibly couple the valve stem to the valve body.

Anti-rotation features 630 include slots 624 and a pair of protrusions (AKA flanges and/or tangs) 632, which each extend through one of slots 624. Each protrusion 632 extends radially from a proximal end of valve plug 627 exterior to resilient seating surface 622. Protrusions 632 may be substantially flat, and may extend parallel to an external surface of the valve plug. Protrusions 632 may be oriented at 180° angles with respect to each other, so that the protrusions extend in opposite directions. Each protrusion 632 is received by a respective slot, such that the protrusion contacts edges of the slot when the valve stem is laterally translated or rotated within the valve cavity to boundaries of a range of motion defined by the slot. Accordingly, a long axis of each slot may correspond to a rotational range of motion of the valve stem and a short axis of each slot may correspond to an axial range of motion of the valve stem (e.g., along an axis defined by the valve stem). The slots and protrusions may collectively restrict rotation of the valve stem, as well as limit a lateral range of motion of the valve stem.

G. Illustrative Method for Releasing Air from a Valve

Figure 31:
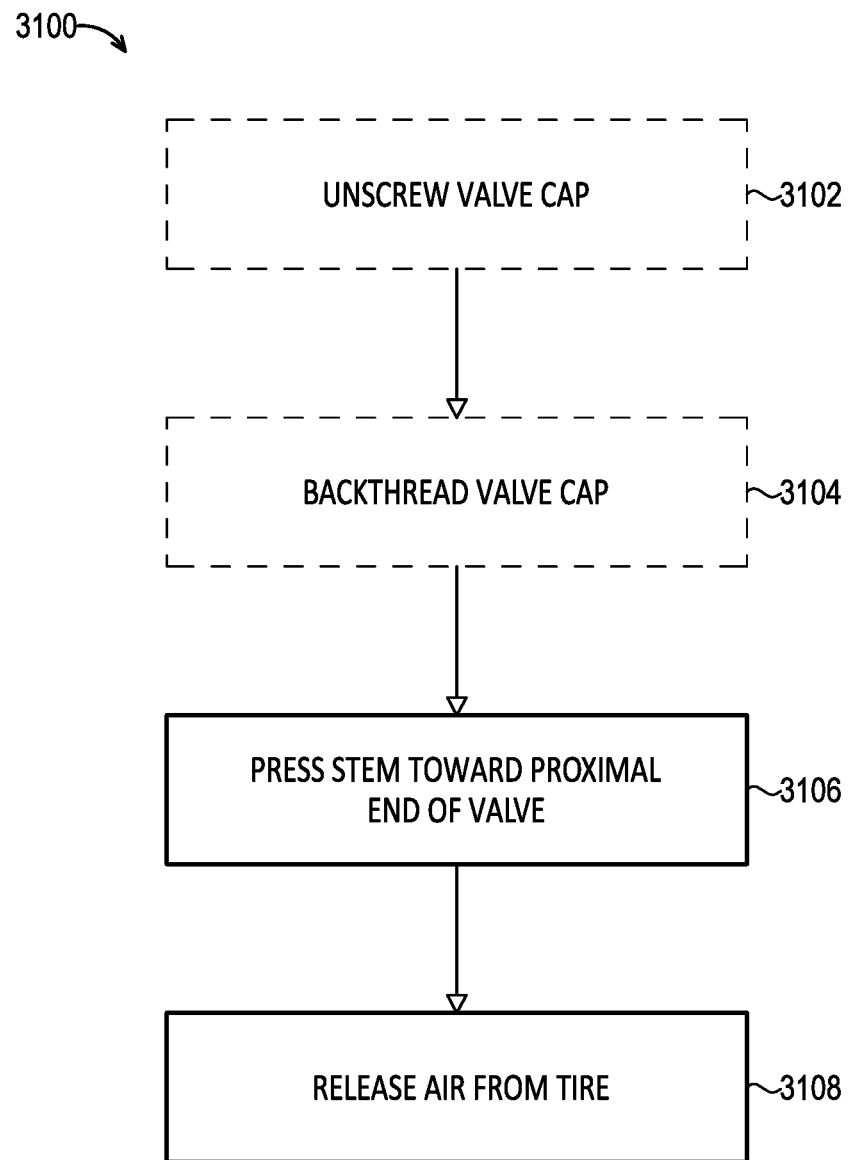
FIG. 31 is a is a flow chart depicting steps of an illustrative method for releasing air from a tire valve according to the present teachings.

This section describes steps of an illustrative method 1900 for releasing air from a valve, such as valves of the present disclosure; see FIG. 31. Aspects of valves 100, 200, 300, 400, 500, and 600 may be utilized in the method steps described below. Where appropriate, reference may be made to components and systems that may be used in carrying out each step. These references are for illustration, and are not intended to limit the possible ways of carrying out any particular step of the method.

FIG. 31 is a flowchart illustrating steps performed in an illustrative method, and may not recite the complete process or all steps of the method. Although various steps of method 1900 are described below and depicted in FIG. 31, the steps need not necessarily all be performed, and in some cases may be performed simultaneously or in a different order than the order shown.

Step 1902 of method 1900 includes optionally unscrewing a valve cap from a valve. Step 1902 may include fully or partially unscrewing the valve cap from a threaded end of a valve stem. In some examples, step 1902 includes partially unscrewing the valve cap, such that the valve cap remains connected to the threaded end of the valve stem. In some examples, step 1902 includes fully unscrewing the valve cap and removing the valve cap from the valve stem.

Step 1904 of method 1900 optionally includes back-threading the valve cap onto the valve stem. This may involve threading a fully unscrewed valve cap one turn in a direction opposite to a typical direction of threading (e.g., the valve cap typically turns clockwise to tighten and is instead threaded counterclockwise onto the valve stem). This may ensure that valve flow is not limited by interior surfaces of the valve cap contacting the distal end of the valve body.

Step 1906 of method 1900 includes pressing the stem toward the proximal end of the valve. In some examples, the valve cap is threaded onto the threaded end of the valve stem, and pressing the valve cap toward the proximal end of the valve also moves the valve stem. In some examples, the valve body and valve stem include anti-rotation features, which may constrain a range of motion of the valve stem.

Step 1908 of method 1900 includes releasing a selected amount of air from the tubeless tire. Moving the valve stem unseats a resilient seating member from a valve seat. This allows air to be released from the tire.

H. Illustrative Combinations and Additional Examples

This section describes additional aspects and features of anti-rotation tire valves, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An inflation valve for a tubeless tire, the valve comprising:

a valve body having a proximal end, an open distal end, and a slot disposed adjacent to the proximal end of the valve body, and defining an internal cavity; and a valve stem extending continuously through the internal cavity, such that a threaded end of the valve stem protrudes beyond the open distal end of the valve body;

wherein the proximal end of the valve body comprises a valve seat having an outer diameter larger than an inner diameter of the valve body, and a corresponding proximal end of the valve stem includes a resilient seating surface and a radial protrusion received by the slot;

wherein the valve is configured to be transitionable between:
 (a) a closed position, in which the resilient seating surface mates with the valve seat and seals the proximal end of the valve body, and the threaded end of the valve stem extends beyond the distal end of the valve body by a first distance, and
 (b) an open position, in which the resilient seating surface is spaced from the valve seat, and the threaded end of the valve stem extends beyond the distal end of the valve body by a second distance less than the first distance; and wherein the slot and the radial protrusion collectively restrict rotation of the valve stem while the inflation valve is in use.

A1. The inflation valve of paragraph A0, wherein the resilient seating surface comprises an O-ring.

A2. The inflation valve of paragraphs A0 or A1, wherein the proximal end of the valve stem comprises a recess forming a polygonal socket.

A3. The inflation valve of any of paragraphs A0 through A2, further comprising:

a threaded insert removably coupled to the proximal end of the valve body, the threaded insert including a first portion forming the valve seat and a second portion including a threaded outer surface and the slot.

A4. The inflation valve of any of paragraphs A0 through A3, wherein the protrusion contacts edges of the slot when the valve stem is laterally translated or rotated within the valve cavity, such that dimensions of the valve stem restrict a range of motion of the valve stem.

A5. The inflation valve of any of paragraphs A0 through A4, wherein the protrusion extends from a proximal surface of a valve plug including the resilient seating surface.

A6. The inflation valve of any of paragraphs A0 through A5, wherein the slot is substantially elongate in shape, and wherein a long axis of the slot is parallel to a proximal edge of the valve body.

A7. The inflation valve of paragraphs A6, wherein the slot is stadium-shaped, or a rectangle having rounded end portions, or a rounded rectangle shape.

A8. The inflation valve of any of paragraphs A0 through A7, wherein the slot and the protrusion collectively form a retaining mechanism for the valve stem.

A9. The inflation valve of any of paragraphs A0 through A8, wherein the resilient seating surface comprises a gasket.

B0. An inflation valve for a tubeless tire, the valve comprising:

a valve body having a proximal end and an open distal end, and defining an internal cavity; and a valve stem extending continuously through the internal cavity, such that a threaded end of the valve stem protrudes beyond the open distal end of the valve body;

wherein the proximal end of the valve body comprises a valve seat having an outer diameter larger than an inner diameter of the valve body and a recessed keyway, and a corresponding proximal end of the valve stem includes a valve plug including a resilient seating surface and an elongate protruding ridge configured to be received by the keyway;

wherein the valve is configured to be transitionable between:
 (a) a closed position, in which the resilient seating surface mates with the valve seat and seals the proximal end of the valve body, and the threaded end of the valve stem extends beyond the distal end of the valve body by a first distance, and
 (b) an open position, in which the resilient seating surface is spaced from the valve seat, and the threaded end of the valve stem extends beyond the distal end of the valve body by a second distance less than the first distance; and wherein the keyway and the elongate protruding ridge collectively restrict rotation of the valve stem when the valve is in use.

B1. The inflation valve of paragraph B0, wherein the elongate protruding ridge is disposed on an interior surface of the valve plug.

B2. The inflation valve of paragraph B0 or B1, wherein the recessed keyway is disposed interior to the valve seat.

B3. The inflation valve of any of paragraphs B0 through B2, wherein the protruding ridge and the keyway have no more than two axes of symmetry.

B4. The inflation valve of paragraph B3, wherein the protruding ridge and the keyway collectively restrict orientation of the valve stem to two positions: (a) a first position, and (b) a second position oriented at a 180° angle with respect to the first position.

B5. The inflation valve of any of paragraphs B0 through B4, wherein the protruding ridge has a bulging elliptical profile.

B6. The inflation valve of any of paragraphs B0 through B5, wherein the resilient seating surface comprises an O-ring. B7. The inflation valve of any of paragraphs B0 through B6, wherein the resilient seating surface comprises a gasket.

C0. An inflation valve for a tubeless tire, the valve comprising:

a valve body having a proximal end and an open distal end, and defining an internal cavity, and including at least one interior channel extending the length of the valve body; and a valve stem extending continuously through the internal cavity, such that a threaded end of the valve stem protrudes beyond the open distal end of the valve body, and including at least one lateral protrusion coupled to an elongate valve shaft of the valve stem;

wherein the proximal end of the valve body comprises a valve seat having an outer diameter larger than an inner diameter of the valve body and a corresponding proximal end of the valve stem includes a resilient seating surface;

wherein the valve is configured to be transitionable between:
 (a) a closed position, in which the resilient seating surface mates with the valve seat and seals the proximal end of the valve body, and the threaded end of the valve stem extends beyond the distal end of the valve body by a first distance, and (b) an open position, in which the resilient seating surface is spaced from the valve seat, and the threaded end of the valve stem extends beyond the distal end of the valve body by a second distance less than the first distance;

wherein the at least one lateral protrusion is configured to be slidably received by the at least one channel; and wherein the at least one channel and the at least one protrusion collectively restrict rotation of the valve stem when the valve is in use.

C1. The inflation valve of paragraph C0, wherein the valve stem includes at least two lateral protrusions, and wherein the valve body includes at least two interior channels.

C2. The inflation valve of paragraph C0 or C1, wherein each protrusion has an elongate shape, and wherein a long axis of each protrusion extends parallel to an axis defined by the valve stem.

C3. The inflation valve of any of paragraphs C0 through C2, wherein each protrusion is equally spaced around the valve stem.

C4. The inflation valve of any of paragraphs C0 through C3, wherein the at least one protrusion is disposed closer to the threaded end of the valve stem than to the proximal end of the valve stem.

C5. The inflation valve of any of paragraphs C0 through C4, wherein the resilient seating surface comprises an O-ring.

C6. The inflation valve of any of paragraphs C0 through C5, wherein the resilient seating surface comprises a gasket.

D0. An inflation valve for a tubeless tire, the valve comprising:

a valve body having a proximal end and an open distal end, defining an internal cavity, and including an elongate recess disposed within the valve body; and a valve stem extending continuously through the internal cavity, such that a threaded end of the valve stem protrudes beyond the open distal end of the valve body, the valve stem having a radial protrusion extending from the valve stem configured to be received by the elongate recess;

wherein the proximal end of the valve body comprises a valve seat having an outer diameter larger than an inner diameter of the valve body and a circumferential channel receiving a c-clip, and a corresponding proximal end of the valve stem includes a valve plug including a resilient seating surface;

wherein the valve is configured to be transitionable between:

(a) a closed position, in which the resilient seating surface mates with the valve seat and seals the proximal end of the valve body, the radial protrusion is received by the elongate recess, and the threaded end of the valve stem extends beyond the distal end of the valve body by a first distance, and (b) an open position, in which the resilient seating surface is spaced from the valve seat, the radial protrusion is directly contacting the c-clip, and the threaded end of the valve stem extends beyond the distal end of the valve body by a second distance less than the first distance;

wherein the elongate recess and the radial protrusion collectively restrict rotation of the valve stem when the valve is in use; and wherein the radial protrusion, the elongate recess, and the c-clip collectively restrict axial movement of the valve stem when the valve is in use.

D1. The inflation valve of paragraph D0, wherein the circumferential channel is disposed interior to the valve seat.

D2. The inflation valve of paragraph D0 or D1, wherein the radial protrusion and the elongate recess have no more than two axes of symmetry.

D3. The inflation valve of paragraph D2, wherein the radial protrusion and the elongate recess collectively restrict orientation of the valve stem to two positions: (a) a first position, and (b) a second position oriented at a 180° angle with respect to the first position.

D4. The inflation valve of any of paragraphs D0 through D3, wherein the elongate recess has a stadium-shaped profile.

D5. The inflation valve of any of paragraphs D0 through D4, wherein the c-clip comprises steel.

D6. The inflation valve of any of paragraphs D0 through D5, wherein the radial protrusion has a pointed side profile.

D7. The inflation valve of any of paragraphs D0 through D6, wherein the resilient seating surface comprises an O-ring.

D8. The inflation valve of any of paragraphs D0 through D7, wherein the resilient seating surface comprises a gasket.

E0. An inflation valve for a tubeless tire, the valve comprising:

a valve body having a proximal end, an open distal end, and a pair of notches disposed adjacent to the proximal end of the valve body, and defining an internal cavity;

a cap defining an aperture and reversibly coupled to the proximal end of the valve body, such that the cap and the pair of notches collectively define a pair of slots; and a valve stem extending continuously through the internal cavity, such that a threaded end of the valve stem protrudes beyond the open distal end of the valve body;

wherein the proximal end of the valve body comprises a valve seat having an outer diameter larger than an inner diameter of the valve body, and a corresponding proximal end of the valve stem includes a resilient seating surface and a pair of radial protrusions, each received by a respective slot;

wherein the valve is configured to be transitionable between:

(a) a closed position, in which the resilient seating surface mates with the valve seat and seals the proximal end of the valve body, and the threaded end of the valve stem extends beyond the distal end of the valve body by a first distance, and (b) an open position, in which the resilient seating surface is spaced from the valve seat, and the threaded end of the valve stem extends beyond the distal end of the valve body by a second distance less than the first distance; and wherein the slots and the radial protrusions collectively restrict rotation of the valve stem while the inflation valve is in use.

E1. The inflation valve of paragraph E0, wherein the resilient seating surface comprises an O-ring.

E2. The inflation valve of paragraphs E0 or E1, wherein the proximal end of the valve stem comprises a recess forming a polygonal socket.

E3. The inflation valve of any of paragraphs E0 through E2, wherein each protrusion contacts edges of the respective slot when the valve stem is laterally translated or rotated within the valve cavity, such that dimensions of the valve stem restrict a range of motion of the valve stem.

E4. The inflation valve of any of paragraphs E0 through E4, wherein each protrusion extends from a proximal surface of a valve plug including the resilient seating surface.

E5. The inflation valve of any of paragraphs E0 through E4, wherein each slot is substantially elongate in shape, and wherein a long axis of the slot is parallel to a proximal edge of the valve body.

E6. The inflation valve of paragraph E5, wherein each slot is stadium-shaped, or a rectangle having rounded end portions, or a rounded rectangle shape.

E7. The inflation valve of any of paragraphs E0 through E6, wherein the slots and the protrusions collectively form a retaining mechanism for the valve stem.

E8. The inflation valve of any of paragraphs E0 through E7, wherein the cap comprises plastic.

E9. The inflation valve of any of paragraphs E0 through E8, wherein the cap comprises fingers configured to engage an overhanging lip of the valve body in a (e.g., cantilevered) snap-fit.

E10. The inflation valve of any of paragraphs E0 through E9, wherein the resilient seating surface comprises a gasket.

Advantages, Features, and Benefits

The different embodiments and examples of the valve having anti-rotation features described herein provide several advantages over known solutions for inflating tubeless bicycle tires. For example, illustrative embodiments and examples described herein seal the valve body, preventing air from passing from the tire into the valve. This prevents sealant in the tire from clogging the valve.

Additionally, and among other benefits, illustrative embodiments and examples described herein have a larger internal diameter than typical bicycle valves (e.g., Presta valves or Schrader valves). This results in a higher air flow and reduced clogging, while the valve body still fits in a rim hole drilled for a Presta valve. Higher air flow makes seating a tire to a bicycle rim easier, improves pumping speed, and allows for the injection of sealant into the tire without the removal of a valve core. Higher air flow also eliminates the need for compressed air. The larger internal diameter also allows for rapid tire deflation.

Additionally, and among other benefits, illustrative embodiments and examples described herein allow valve disassembly for cleaning purposes.

Additionally, and among other benefits, illustrative embodiments and examples described herein are compatible with standard pump heads (e.g., clamp-on and threaded).

Additionally, and among other benefits, illustrative embodiments and examples described herein are compatible with tubeless bicycle rims and standard rims.

Additionally, and among other benefits, illustrative embodiments and examples described herein allow for the release of air from the tire without removing the valve cap.

Additionally, and among other benefits, illustrative embodiments and examples described herein may provide stronger seals than conventional bicycle pump connections, allowing for higher air pressures.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An inflation valve for a tubeless tire, the valve comprising:
    a valve body having a proximal end, an open distal end, and defining an internal cavity; and
    a valve stem having a long axis and extending through the internal cavity, such that a threaded end of the valve stem protrudes beyond the open distal end of the valve body;
    wherein the proximal end of the valve body comprises a valve seat having an outer diameter larger than an inner diameter of the valve body, and a corresponding proximal end of the valve stem includes a resilient seating surface and a radial protrusion received by a slot in a side wall of the valve body;
    wherein the valve is configured to be transitionable between:
        (a) a closed position, in which the resilient seating surface mates with the valve seat and seals the proximal end of the valve body, and the threaded end of the valve stem extends beyond the distal end of the valve body by a first distance, and
        (b) an open position, in which the resilient seating surface is spaced from the valve seat, and the threaded end of the valve stem extends beyond the distal end of the valve body by a second distance less than the first distance; and
    wherein the slot and the radial protrusion are configured to collectively restrict rotation of the valve stem about the long axis.

2. The inflation valve of claim 1, wherein the resilient seating surface comprises a gasket.

3. The inflation valve of claim 1, wherein the proximal end of the valve stem comprises a polygonal socket.

4. The inflation valve of claim 1, further comprising:
    a threaded insert removably coupled to the proximal end of the valve body, the threaded insert including a first portion forming the valve seat and a second portion including a threaded outer surface and the slot.

5. The inflation valve of claim 1, wherein the protrusion contacts edges of the slot when the valve stem is laterally translated or rotated within the internal cavity, such that dimensions of the valve stem are configured to restrict a range of motion of the valve stem.

6. The inflation valve of claim 1, wherein the protrusion extends radially from a proximal surface of a valve plug including the resilient seating surface.

7. The inflation valve of claim 1, wherein the slot has a rounded-rectangle shape.

8. The inflation valve of claim 7, wherein the slot has a rounded-square shape.

9. The inflation valve of claim 1, wherein the slot and the protrusion collectively form a retaining mechanism for the valve stem.

* * * * *